United States Patent
Dharmadhikari et al.

(10) Patent No.: US 10,198,766 B1
(45) Date of Patent: Feb. 5, 2019

(54) SYSTEMS AND METHODS FOR SELECTING LOAN PAYMENT TERMS FOR IMPROVED LOAN QUALITY AND RISK MANAGEMENT

(75) Inventors: Sachin Dharmadhikari, Bristow, VA (US); Ganesh Krishnamoorthy, Fairfax, VA (US)

(73) Assignee: Federal Home Loan Mortgage Corporation (Freddie Mac), McLean, VA (US)

( * ) Notice: Subject to any disclaimer, the term of this patent is extended or adjusted under 35 U.S.C. 154(b) by 1869 days.

(21) Appl. No.: 12/818,456

(22) Filed: Jun. 18, 2010

(51) Int. Cl.
*G06Q 30/00* (2012.01)
*G06Q 40/00* (2012.01)
*G06F 17/00* (2006.01)

(52) U.S. Cl.
CPC ............. *G06Q 40/00* (2013.01); *G06F 17/00* (2013.01)

(58) Field of Classification Search
CPC ....................................................... G06F 17/60
USPC ....... 705/1.1, 38, 30, 35, 36 R, 40, 14.53, 4; 713/176; 434/127
See application file for complete search history.

(56) References Cited

U.S. PATENT DOCUMENTS

| | | | |
|---|---|---|---|
| 6,233,566 B1 * | 5/2001 | Levine | G06Q 40/02 705/36 R |
| 2007/0288354 A1 * | 12/2007 | LeClair | G06Q 40/00 705/38 |

* cited by examiner

*Primary Examiner* — John H. Holly
(74) *Attorney, Agent, or Firm* — Finnegan, Henderson, Farabow, Garrett & Dunner, LLP

(57) ABSTRACT

Systems, methods, and computer-readable media are disclosed for selecting loan payment terms for improved loan quality and risk management. An exemplary embodiment includes storing first loan data corresponding to a first loan to a first borrower. The first loan may have been funded based on an initial financial disclosure that reflects the financial status of the first borrower during an initial time period when the first loan was funded. First payment terms and second payment terms are stored, and one of the first payment terms or the second payment terms is selected based on whether the first borrower provides the updated financial disclosure. The first loan data is processed consistently with the selected payment terms.

20 Claims, 15 Drawing Sheets

Loan Data 121

| Loan ID 201 | Year Funded 202 | Original Balance 203 | Remaining Balance 204 | Loan Term 205 | Remaining Term 206 | Zip Code 207 | Borrower ID 208 |
|---|---|---|---|---|---|---|---|
| 1 | 2005 | 100,000 | 90000 | 30 | 25 | 21222 | 101 |
| 2 | 2005 | 200,000 | 180000 | 30 | 25 | 21222 | 102 |
| 3 | 2005 | 300,000 | 270000 | 30 | 25 | 21222 | 103 |
| 4 | 2005 | 200,000 | 180000 | 30 | 25 | 21222 | 104 |
| 5 | 2005 | 400,000 | 360000 | 30 | 25 | 21222 | 105 |

FIG. 2

Payment Term Data 122

| Loan ID 201 | Interest Rate 301 | Monthly Payment 302 | Interest Rate 303 | Monthly Payment 304 | Interest Rate 305 | Monthly Payment 306 |
|---|---|---|---|---|---|---|
| 1 | 5.00 | 536.00 | 6.00 | 600.00 | 4.50 | 506.00 |
| 2 | 6.00 | 1199.00 | 7.00 | 1330.00 | 5.50 | 1136.00 |
| 3 | 5.50 | 1703.00 | 6.50 | 1896.00 | 5.00 | 1610.00 |
| 4 | 6.50 | 1264.00 | 7.50 | 1398.00 | 6.00 | 1199.00 |
| 5 | 4.00 | 1909.00 | 5.00 | 2147.00 | 3.50 | 1796.00 |

FIG. 3

Initial Financial Disclosure Data 123

| Loan ID 201 | Borrower ID 208 | Salary 401 | Credit Score 402 | Monthly Debt Payments 403 | Dependents 404 | Occupation 405 |
|---|---|---|---|---|---|---|
| 1 | 101 | 30,000 | 650 | 400 | 0 | Teacher |
| 2 | 102 | 60,000 | 700 | 0 | 1 | Nurse |
| 3 | 103 | 100,000 | 720 | 900 | 2 | Engineer |
| 4 | 104 | 130,000 | 700 | 600 | 0 | Lawyer |
| 5 | 105 | 160,000 | 780 | 300 | 0 | Doctor |

FIG. 4

Updated Financial Disclosure Data 124

| Borrower ID 208 | Year 501 | Mandatory Attributes | | | | Optional Attributes | | |
|---|---|---|---|---|---|---|---|---|
| | | Filing Status 502 | TBP 503 | Chg. Deps. 504 | Income Red. 505 | Credit 506 | Occupation 507 | Tax Return 508 |
| 101 | 2006 | S | 15 | No | No | Not Reported | Not Reported | Not Reported |
| 102 | 2006 | MJ | 15 | No | No | Not Reported | Not Reported | Not Reported |
| 103 | 2006 | MJ | 25 | No | No | Not Reported | Not Reported | Not Reported |
| 104 | 2006 | S | 28 | No | No | Reported | Reported | Reported |
| 105 | 2006 | S | 35 | No | No | Reported | | Reported |
| 101 | 2007 | S | 15 | No | No | Not Reported | Not Reported | Not Reported |
| 102 | 2007 | MJ | 15 | No | No | Not Reported | Not Reported | Not Reported |
| 103 | 2007 | MJ | 25 | No | No | Not Reported | Not Reported | Not Reported |
| 104 | 2007 | S | 28 | No | No | Reported | Reported | Reported |
| 105 | 2007 | S | 35 | No | No | Reported | Reported | Reported |
| 101 | 2008 | S | 15 | No | No | Not Reported | Not Reported | Not Reported |
| 102 | 2008 | MJ | 15 | No | No | Not Reported | Not Reported | Not Reported |
| 103 | 2008 | MJ | 25 | No | No | Not Reported | Not Reported | Not Reported |
| 104 | 2008 | S | 28 | No | No | Reported | Reported | Reported |
| 105 | 2008 | S | 35 | No | No | Reported | Reported | Reported |
| 101 | 2009 | MJ | 10 | No | No | Not Reported | Not Reported | Not Reported |
| 102 | 2009 | Not Reported | Not Reported | Not Reported | Not Reported | Not Reported | Not Reported | Not Reported |
| 103 | 2009 | MJ | 25 | No | No | Not Reported | Not Reported | Not Reported |
| 104 | 2009 | S | 28 | No | No | Reported | Reported | Reported |
| 105 | 2009 | MJ | 35 | Yes | No | Reported | Reported | Reported |

FIG. 5

| | | | | Security Data 125 | | | | |
|---|---|---|---|---|---|---|---|---|
| MBS ID 801 | Loan ID 201 | 2010 Rate 802 | Original Balance 203 | Total Original Balance 803 | Loan Weight 804 | Average Interest 805 | Risk Score 1006 | Weighted Risk Score 806 |
| 1 | 1 | 5.00% | 100,000 | 600,000 | 16.67% | 5.92% | 6.49 | 12.44 |
|   | 2 | 7.00% | 200,000 |         | 33.33% |       | 9.74 |       |
|   | 3 | 5.50% | 300,000 |         | 50.00% |       | 16.23 |      |
| 2 | 4 | 6.00% | 200,000 | 600,000 | 33.33% | 4.33% | 14.26 | 19.90 |
|   | 5 | 3.50% | 400,000 |         | 66.67% |       | 22.72 |      |

FIG. 8

Tax Bracket Table 1000

| Filing Status 1001 | Tax Year 1002 | Min Taxable Income 1003 | Max Taxable Income 1004 | TBP 1005 | Risk Score 1006 |
|---|---|---|---|---|---|
| Single | 2009 | 0 | 8350 | 10 | 5.09 |
| Single | 2009 | 8351 | 33950 | 15 | 7.64 |
| Single | 2009 | 33951 | 82250 | 25 | 12.73 |
| Single | 2009 | 82251 | 171550 | 28 | 14.26 |
| Single | 2009 | 171551 | 372950 | 33 | 16.81 |
| Single | 2009 | 372951 | 372951 | 35 | 17.83 |
| | | Sum | 1042001.00 | 146 | |
| | | PWT 1007 | 7136.99 | | |
| | | | | | |
| Married/Joint | 2009 | 0 | 16700 | 10 | 6.49 |
| Married/Joint | 2009 | 16701 | 67900 | 15 | 9.74 |
| Married/Joint | 2009 | 67901 | 137050 | 25 | 16.23 |
| Married/Joint | 2009 | 137051 | 208850 | 28 | 18.18 |
| Married/Joint | 2009 | 208851 | 372950 | 33 | 21.42 |
| Married/Joint | 2009 | 372951 | 372951 | 35 | 22.72 |
| | | Sum | 1176401 | 146 | |
| | | PWT 1007 | 8057.54 | | |

FIG. 10

Rules Table 1200

| Rule No. 1201 | Risk Score 1202 | Filing Status 1203 | TBP 1204 | Reduced Income 1205 | Risk Category 1206 |
|---|---|---|---|---|---|
| R1 | No change | any | No Change | No | No change |
| R2 | Decrease | No Change | Decrease | Yes | Default risk |
| R3 | Decrease | From "S" to "MJ" | Decrease | No | No change |
| R4 | Increase | No Change | Increase | No | Prepayment Risk |
| R5 | Increase | From "S" to "MJ" | No Change | No | No change |

FIG. 12

SYSTEMS AND METHODS FOR SELECTING LOAN PAYMENT TERMS FOR IMPROVED LOAN QUALITY AND RISK MANAGEMENT

DESCRIPTION

I. Technical Field

The present disclosure generally relates to the field of finance. More particularly, and without limitation, the disclosure relates to systems and methods for selecting loan payment terms for improved loan quality and risk management. Loan data is stored for a loan to a borrower that was funded during an initial time period. A determination is made as to whether the borrower has provided an updated financial disclosure that reflects the financial status of the borrower after the first loan was funded. Payment terms are selected for the loan based on whether the borrower has provided the updated financial disclosure.

II. Background Information

Loans, such as home mortgages, have certain associated risks, such as the risk that a borrower may default on a loan or may prepay the loan. In the case of a loan default, the original lender or subsequent purchaser of the loan stands to lose both the interest on the loan as well as the principal, whereas in the case of a loan prepayment, the lender may only lose the interest they would otherwise receive from the loan. Generally, borrowers are required to provide certain initial financial disclosures in order to obtain a loan, and lenders evaluate the risk of payment events such as defaults and prepayments before agreeing to fund a loan. Such risks can be evaluated by considering the borrower's credit reputation, capacity to repay the loan, and the value of any collateral securing the loan.

During the life of a loan, the financial disclosures initially provided by the borrower may be used to predict the risk of defaults or prepayments. The value of loan collateral, such as a home, may be re-evaluated over time to determine how much money the lender stands to lose in the event of a default and eventual foreclosure. Thus, lenders are able to evaluate the risk associated with their loan portfolios by predicting the likelihood of defaults and prepayments based on the initial financial disclosures, and can estimate the extent of their losses in the event of foreclosures based on updated estimates of the value of the collateral.

However, the financial status of a borrower does not necessarily remain static, and thus the initial financial disclosures provided when a loan is originally funded may not accurately reflect the financial status of the borrower several years after funding, during the repayment period of the loan. Because the borrower typically does not have any obligation or incentive to provide additional financial information to the lender once a loan is funded, lenders may not have up-to-date financial information for the borrowers of the loans in their portfolio. Rather, lenders often only know whether the borrower is making their loan payments as required by the terms of the loan (i.e., whether the loan is "performing"), and do not have insight as to how the financial status of the borrower has changed subsequent to the funding of the loan.

For this reason, existing techniques for evaluating the risks associated with performing loans are not ideal. Under the principles of the present disclosure, it is desirable to obtain updated financial disclosures from borrowers during the payment term of a loan, and evaluate the default or prepayment risk associated with the loan based on the updated financial disclosure from the borrower. It is further desirable to give the borrower incentives to provide the updated financial disclosures so that they will agree to do so, and thus enable lenders to evaluate loan risks based on the borrower's current financial status, rather than merely using the borrower's initial financial status at the time the loan was funded.

SUMMARY

Consistent with exemplary embodiments of the invention, computer-implemented methods, systems, and computer-readable media are provided.

A computer-implemented method for selecting loan payment terms may include storing, by a computing platform, first loan data corresponding to a first loan to a first borrower, the first loan being funded based on an initial financial disclosure, the initial financial disclosure reflecting the financial status of the first borrower during an initial time period when the first loan was funded; storing, by the computing platform, first payment terms reflecting a first payment obligation of the first borrower on the first loan for use when the first borrower provides an updated financial disclosure, the updated financial disclosure reflecting the financial status of the first borrower after the first loan was funded; storing, by the computing platform, second payment terms reflecting a second payment obligation of the first borrower for the first loan for use when the first borrower does not provide the updated financial disclosure; determining, by the computing platform, whether the first borrower provides the updated financial disclosure; selecting, using the computing platform, one of the first payment terms or the second payment terms, based on whether the first borrower provides the updated financial disclosure; and processing, by the computing platform, the first loan data consistently with the selected payment terms.

A system may include a loan processor configured to: store first loan data corresponding to a first loan to a first borrower, the first loan being funded based on an initial financial disclosure, the initial financial disclosure reflecting the financial status of the first borrower during an initial time period when the first loan was funded; store first payment terms reflecting a first payment obligation of the first borrower on the first loan for use when the first borrower provides an updated financial disclosure, the updated financial disclosure reflecting the financial status of the first borrower after the first loan was funded; store second payment terms reflecting a second payment obligation of the first borrower for the first loan for use when the first borrower does not provide the updated financial disclosure; determine whether the first borrower provides the updated financial disclosure; select one of the first payment terms or the second payment terms, based on whether the first borrower provides the updated financial disclosure; and process the first loan data consistently with the selected payment terms, and a computer processor for executing the loan processor.

A computer-readable medium may include instructions for causing a processor to execute a method selecting loan payment terms, and the method may include: storing first loan data corresponding to a first loan to a first borrower, the first loan being funded based on an initial financial disclosure, the initial financial disclosure reflecting the financial status of the first borrower during an initial time period when the first loan was funded; storing first payment terms reflecting a first payment obligation of the first borrower on the first loan for use when the first borrower provides an updated financial disclosure, the updated financial disclosure reflecting the financial status of the first borrower after the first loan was funded; storing second payment terms reflecting a second payment obligation of the first borrower for the first loan for use when the first borrower does not provide the updated financial disclosure; determining whether the first borrower provides the updated financial disclosure; selecting one of the first payment terms or the second payment terms, based on whether the first borrower provides the updated financial disclosure; and processing the first loan data consistently with the selected payment terms.

A computer-implemented method for modifying loan payment terms may include: storing, by a computing platform, loan data corresponding to a loan to a borrower, the loan having been funded based on initial financial disclosure, the initial financial disclosure reflecting the financial status of the borrower during an initial time period when the loan was funded; storing, by the computing platform, initial payment terms reflecting initial payment obligations of the borrower for the loan; storing, by the computing platform, modified payment terms for the loan, the modified payment terms reflecting modified payment obligations of the borrower based on an agreement by the borrower to provide an updated financial disclosure, the updated financial disclosure reflecting the financial status of the borrower during a time period subsequent to the initial time period; determining, by the computing platform, whether the borrower provides the updated financial disclosure; and processing, by the computing platform, the loan data consistently with the modified payment terms, based on whether the borrower provides the updated financial disclosure.

A computer-implemented method for administering a mortgage-backed security may include: storing, by a computing platform, security data identifying a group of loans to a plurality of borrowers, the group of loans including a first loan to a first borrower, wherein the group of loans correspond to a security and payment obligations on the security are based on income from the group of loans; storing, by the computing platform, first payment terms reflecting a first payment obligation of the first borrower on the first loan when the first borrower provides an updated financial disclosure, the updated financial disclosure reflecting the financial status of the first borrower after the first loan was funded; storing, by the computing platform, second payment terms reflecting a second payment obligation of the first borrower for the first loan when the first borrower does not provide the updated financial disclosure; and processing the security data such that the payments on the security are based on: the first payment terms, when the first borrower provides the updated financial disclosure, and the second payment terms, when the first borrower does not provide the updated financial disclosure.

A computer-implemented method for evaluating the risk of payment events on a loan may include: storing, by a computing platform, loan data identifying a loan to a borrower, the loan having been funded based upon initial financial disclosures reflecting the financial status of the borrower during an initial time period when the loan was funded; receiving, by the computing platform, first updated financial disclosure data reflecting a first updated financial disclosure for the borrower, the first updated financial disclosure data reflecting the financial status of the borrower during a first time period subsequent to the initial time period; storing, by the computing platform, the first updated financial disclosure data in a database; receiving, by the computing platform, second updated financial disclosure data reflecting a second updated financial disclosure for the borrower, the second updated financial disclosure data reflecting the financial status of the borrower during a second time period subsequent to the first time period; storing, by the computing platform, the second updated financial disclosure data in the database; processing, using the computing platform, the first updated financial data and the second updated financial data to develop risk information for the loan, the risk information reflecting the likelihood of a predetermined payment event for the loan; and providing, using the computing platform, the risk information to a user.

A computer-implemented method for evaluating the risk of payment events on loans underlying a security may include: storing, by a computing platform, loan data identifying a group of loans to a plurality of borrowers, the loans having been funded based upon initial financial disclosures reflecting the financial status of the borrowers during initial time periods when the loans were funded; storing, by the computing platform, security data identifying a security corresponding to the group of loans, wherein payment obligations on the security are based on income from the group of loans; receiving, by the computing platform, updated financial disclosure data reflecting updated financial disclosures for the borrowers, the updated financial disclosure data reflecting the financial status of the borrowers during time periods subsequent to the initial time periods when the loans were funded; storing, by the computing platform, the updated financial disclosure data in a database; processing, using the computing platform, the updated financial data to develop risk information for the security, the risk information reflecting the likelihood of predetermined payment events for the group of loans; and providing, using the computing platform, the risk information to a user.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings:

FIG. 2 illustrates an exemplary data structure, consistent with certain embodiments of the invention;

FIG. 3 illustrates an exemplary data structure, consistent with certain embodiments of the invention;

FIG. 4 illustrates an exemplary data structure, consistent with certain embodiments of the invention;

FIG. 5 illustrates an exemplary data structure, consistent with certain embodiments of the invention;

FIG. 8 illustrates an exemplary data structure, consistent with certain embodiments of the invention;

FIG. 10 illustrates an exemplary data structure, consistent with certain embodiments of the invention;

FIG. 12 illustrates a flowchart of an exemplary method, consistent with certain embodiments of the invention;

DETAILED DESCRIPTION

Reference will now be made in detail to the exemplary embodiments of the invention, examples of which are illustrated in the accompanying drawings. Wherever possible, the same reference numbers will be used throughout the drawings to refer to the same or like parts.

Figure 1:
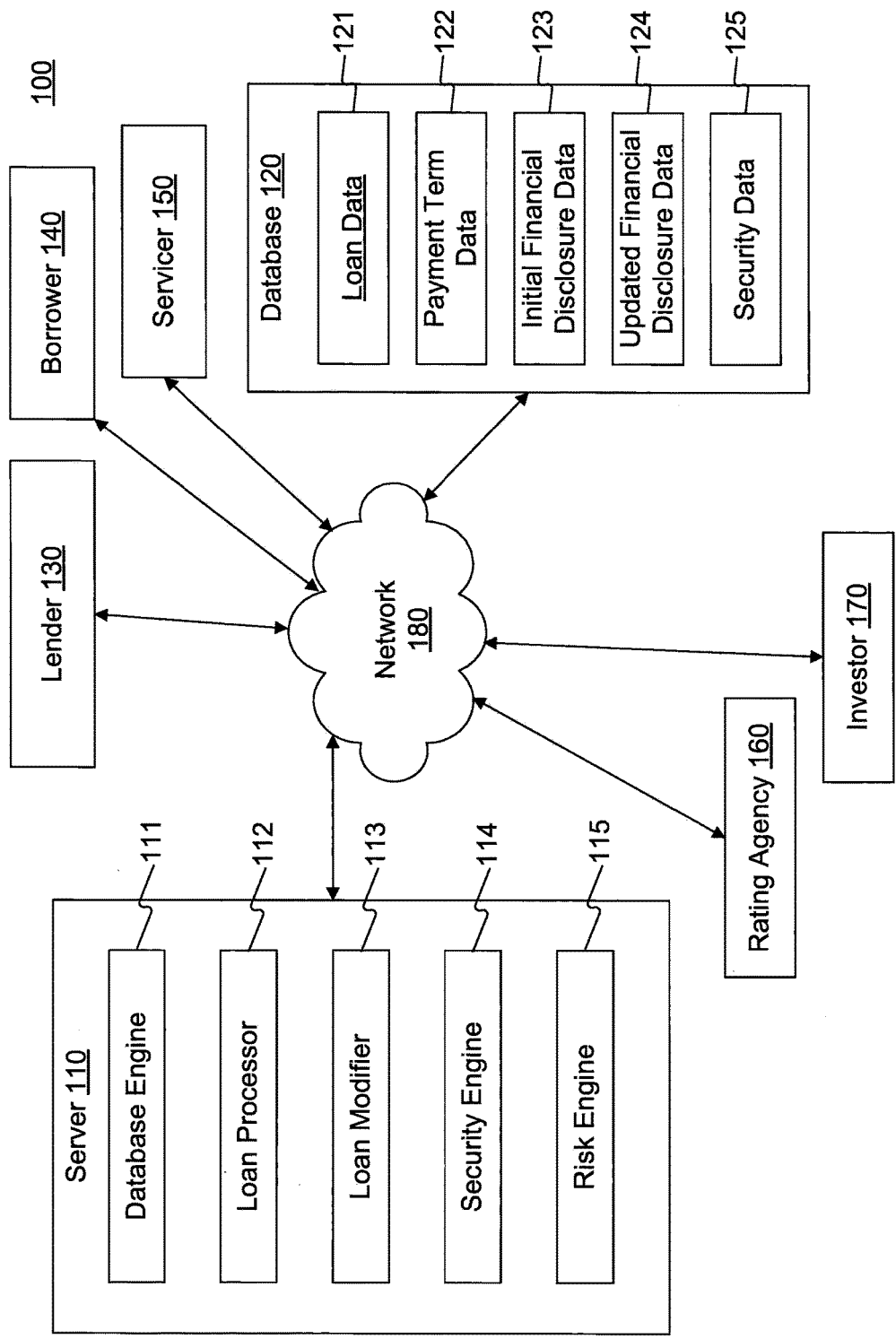
FIG. 1 is a block diagram of an exemplary system, consistent with certain embodiments of the invention.

FIG. 1 illustrates a block diagram of an exemplary system environment that comprises a system 100, consistent with an embodiment of the invention. System 100 may include a server 110. Server 110 may be operated by a financial entity. In the description that follows, the entity that operates server 110 will be referred to as a Government Sponsored Enterprise ("GSE"). However, it will be understood that the server may be operated by an entity other than a GSE.

Server 110 may communicate with various other devices using network 180. For example, server 110 may access a database 120 storing loan data 121 and/or other data, via network 180. Server 110 may further communicate with devices and/or systems, such as computers, operated by a number of other entities, including a lender system 130, a borrower system 140, a servicer system 150, a rating agency system 160, and an investor system 170. As used herein, the terms "lender 130," "borrower 140," "servicer 150," "rating agency 160," and "investor 170" are used to refer interchangeably to the entities themselves as well as the systems operated by the entities, except where it is necessary to distinguish between the entities and the systems. It is to be understood by those skilled in the art that the terms "lender," "borrower," "servicer," "rating agency," and "investor" are not exclusive, and that one or more of systems 130-170 may be operated by the same entity, e.g., the same entity that operates server 110.

Lender 130 may be a lender who originates loans and sells them to the GSE or other financial entity that operates server 110. After the GSE purchases the loans, servicer 150 may service the loans on behalf of the GSE, for example by billing borrowers and collecting payments from the borrowers. Borrower 140 may be a borrower of one of the loans originated by the lender, owned by the GSE, and serviced by the servicer. The GSE may also administer mortgage-backed securities ("MBS's") using server 110, and a credit rating agency 160 may evaluate the MBS's and assign credit ratings to the MBS's based on the evaluation. Investor 170 may be an owner of one or more of the MBS's, or an individual that would like to request information about the MBS's from the GSE.

Although FIG. 1 shows a particular number and arrangement of components, other arrangements and numbers of components could be used to implement embodiments of the invention. For example, there may be various numbers of servers 110, databases 120, lenders 130, borrowers 140, servicers 150, rating agencies 160, and investors 170. Furthermore, each of the illustrated devices may be combined into a single device. For example, the functions of server 110 and database 120 described herein may be implemented on a single server operated by the GSE. The processing described herein for server 110, database 120, lender 130, borrower 140, servicer 150, rating agency 160, and investor 170 may be implemented using general-purpose computers, each including one or more processors, memory, and storage devices. Network 180 may be a wired or wireless network or any combination thereof, such as a home or office LAN in communication with the Internet. Methods described herein may be embodied as processor-readable instructions on computer-readable media, such as a memory in server 110.

Server 110 may include a database engine 111 used for querying, populating, and updating database 120. Database 120 may include loan data 121, which includes various attributes of a loan or loans owned by the GSE. Database 120 may also include payment term data 122, which may include attributes of the payment obligations of one or more borrowers. Database 120 may also include initial financial disclosure data 123, which includes attributes of one or more initial financial disclosures provided by a borrower or borrowers when the corresponding loans were originally funded, as well as updated financial disclosure data 124, which includes attributes of updated financial disclosures provided by the borrowers during the repayment term of the loans. Database 120 may also include security data 125, which may identify how the loans in database 120 are grouped together to form one or more MBS's.

Server 110 may also include a loan processor 112, which may select payment terms for loans from payment term data 122. For example, server 110 may select a more favorable set of payment terms when a borrower has provided updated financial disclosure data 124, and may select a less favorable set of payment terms when the borrower has not done so. Server 110 may also include a loan modifier 113, which may modify payment terms of a loan, such as a conforming mortgage, to be more favorable to the borrower on the loan, based on an agreement by the borrower to provide updated financial disclosure data 124. Server 110 may also include a security engine 114 for administering the MBS's backed by the loans in database 120, and a risk engine 115 for evaluating the risk of prepayments/defaults on the loans, for example, based on updated financial disclosure data 124.

FIG. 2 illustrates exemplary loan data 121. As shown in FIG. 2, loan data 121 includes various attributes of the loans stored in database 120. For example, loan data 121 may include a loan ID 201, used to uniquely identify each loan. Other attributes include year funded 202, which may indicate the year each loan was originally funded, original balance 203, which indicates the original balance on the loan, and remaining balance 204, which reflects the current balance, e.g., based on payments applied to principal after the loan was originally funded. Loan data 121 also includes loan term 205, which represents the original term of the loan, remaining term 206, which may represent the number of years (or other units of time) before the loan will be paid in full if payments are remitted based on the loan's amortization schedule, and zip code 207, which represents the zip code of a property purchased with the loan. In some embodiments, the loan is also secured by the property located in zip code 207. Loan data 121 also includes a borrower ID 208, which uniquely identifies the borrower of the loan.

FIG. 3 illustrates exemplary payment term data 122. Payment term data 122 include attributes reflecting payment obligations of the borrowers of the loans corresponding to loan data 121. For example, the payment term data may include a first interest rate 301, which may represent the interest rate that a borrower receives on a loan, as long as they provide updated financial disclosure data 124 on an annual basis. Other payment terms may include a monthly payment 302, representing a monthly payment obligation of the borrower on the loan, corresponding to first interest rate

301. Second interest rate 303 may represent the interest rate that the borrower receives if they fail to provide certain mandatory attributes of updated financial disclosure data 124 for a given reporting period (e.g., yearly). Second monthly payment 304 may represent a monthly payment obligation of the borrower on the loan if they fail to provide the mandatory attributes of updated financial disclosure data 124 for a given year. Mandatory and optional attributes of updated financial disclosure data 124 will be discussed in more detail below.

As can be seen from FIG. 3, borrowers may generally be charged a higher interest rate when they fail to provide updated financial disclosure data 124. In such embodiments, the borrower has an incentive to periodically update their financial disclosure data 124, because failure to do so results in higher interest rates and higher monthly payments. In some embodiments, second monthly payment 304 simply reflects a higher monthly payment corresponding to second interest rate 303. However, in other embodiments, second monthly payment 304 may instead include a separate penalty fee that is not related to an increased interest rate. As another alternative, the difference between second monthly payment 304 and monthly payment 302 may include two separate components, e.g., a component related to an increased interest rate, and a component from a penalty fee.

Note that the increased interest rate may affect the amortization schedule of the loan, e.g., a different amount of each payment may be applied to the loan principal when the borrower pays second monthly payment 304 than when the borrower pays monthly payment 302. In contrast, the penalty fee does not necessarily affect the amortization schedule of the loan.

Payment term data 122 also includes third interest rate 305, and third monthly payment 306. Third interest rate 305 and monthly payment 306 may reflect interest rates and corresponding monthly payments that a borrower will receive if they not only provide mandatory attributes of updated financial disclosure data 124, but also provide certain optional attributes of updated financial disclosure data 124. As shown in FIG. 3, for example, borrowers may receive a ½ point interest rate deduction and correspondingly lower monthly payment when they provide the optional attributes of updated financial disclosure data 124.

FIG. 4 illustrates exemplary initial financial disclosure data 123 provided by borrower IDs 101-105 for the loans 1-5 identified in loan data 121. Initial financial disclosure data 123 represents the financial disclosures that each of borrowers 101-105 provided when they initially received corresponding loans 1-5. Generally speaking, borrowers are required to provide relatively detailed financial information when first taking out a loan, such as a loan used to purchase a home. For example, initial financial disclosure data 123 may include the borrower's salary 401, their credit score 402, monthly debt payments 403 (e.g., credit card, student loans, auto loan, etc.), number of dependents 404, and occupation 405. As loans 1-5 were each funded in 2005, initial financial data 123 reflects the salary, credit score, monthly debt payments, number of dependents, and occupation of each borrower during 2005.

The borrower attributes reflected in initial financial disclosure data 123 may change over time, however. For example, the borrower may get a raise, lose their job, or take a different job, which may affect their salary or occupation. Likewise, a borrower may take certain steps, such as reducing their debt load, to increase their credit score, or reduce their monthly debt payments. Likewise, a borrower may take on more debt or default on one or more debts, which may decrease their credit score and/or increase their monthly debt obligations. Borrowers may also change occupations and gain/lose dependents due to circumstances such as child birth, marriage, divorce, death, etc. However, initial financial disclosure data 123 does not reflect such changes in the borrower's circumstances.

FIG. 5 illustrates exemplary updated financial disclosure data 124. In some embodiments, borrowers may provide updated financial disclosures to the GSE on an annual basis, and the GSE stores the updated financial disclosures received from the borrowers in database 120 as updated financial disclosure data 124. In other embodiments, borrowers may provide their updated financial disclosures annually to lenders or servicers, and the lenders or servicers provide the updated financial disclosures to the GSE. The updated financial disclosure data 124 may be provided automatically to the GSE by third party entities who may maintain such information. As shown in FIG. 5, updated financial disclosure data 124 may include an attribute for the year of the disclosure, e.g., in year field 501. FIG. 5 reflects updated financial disclosure data 124 over a four-year span, e.g., 2006-2009. Each row of updated financial disclosure data 124 may be uniquely identified by the combination of borrower ID 208 and year 501. Thus, each row represents one borrower's updated financial disclosure in a given year. In some embodiments, the updated financial disclosures may be provided after the corresponding year has ended. For example, the updated financial disclosures for 2006 may be provided in early 2007, etc.

The attributes of updated financial disclosure data 124 may include filing status 502, which reflects the corresponding tax filing status for year 501. For example, for tax years 2006, 2007, and 2008, borrower 105 reported "S" for "single" tax filing status, whereas in 2009, borrower 105 reported "MJ" for "married filing jointly" tax filing status. TBP 503 may reflect the borrower's tax bracket percentage for the corresponding year. Thus, for example, borrower 104 reported that they fell into the 28% tax bracket in 2005, while borrower 105 reported that they fell into the 35% tax bracket in 2005. Updated financial disclosure data 124 also includes change in dependents flag 504, which reflects whether the corresponding borrower had a change in the number of dependents they claimed in the corresponding year, and income reduction flag 505, which reflects whether the corresponding borrower had a reduction in income relative to the previous reporting period.

Updated financial disclosure data 124 may also include a credit flag 506, which reflects whether the borrower has provided authorization, such as a written agreement, to allow the GSE to check their credit score, and an occupation flag 507, which may reflect whether the corresponding borrower has updated their occupation in the corresponding reporting period. Updated financial disclosure data 124 may also include a tax return flag 508, which may reflect whether the corresponding borrower has provided tax return information for the corresponding year. For example, borrowers may directly provide their tax return to the GSE, lender, or servicer, or use an IRS Form 4506 to have the IRS mail a tax return transcript to the GSE, lender, or servicer.

The attributes of updated financial disclosure data 124 may be conceptually divided into certain "mandatory" attributes, e.g., attributes 502-505, and certain "optional" attributes, e.g., attributes 506-508. In some embodiments, borrowers may be contractually obligated by the terms of their loans to provide mandatory attributes 502-505, and are subject to certain penalties (e.g., interest rate increases and fees reflected by second monthly payment 304) in years when they fail to provide these mandatory attributes. In certain embodiments, by contrast, borrowers may not be contractually required to provide optional attributes 506-508. However, borrowers may receive more favorable loan terms in a given year if they provide the optional attributes for the previous year, e.g., lower interest rates such as third interest rate 305 and corresponding lower payments reflected by third monthly payment 306.

Figure 6:
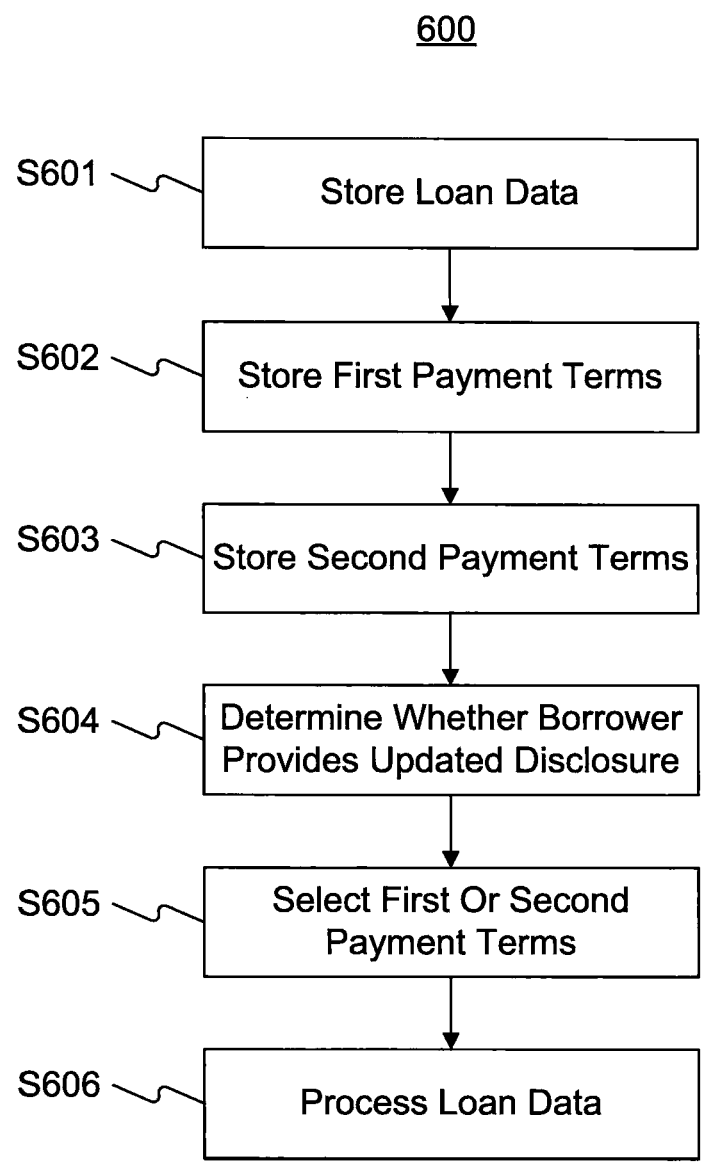
FIG. 6 illustrates a flowchart of an exemplary method, consistent with certain embodiments of the invention.

FIG. 6 illustrates an exemplary method 600, for selecting loan payment terms. Method 600 may be implemented by loan processor 112 of server 110. Although method 600 (and each methods 700, 900, 1100, and 1500 below) is illustrated as a series of method steps, it will be understood that non-dependent steps in the disclosed methods may be performed in a different order or in parallel.

At step S601, loan processor 112 stores loan data. For example, when lender 130 provides a loan to borrower 140, lender 130 may sell the loan and provide associated data to the GSE. At this time, loan processor 112 may store the related data as loan data 121 for the loan. In some embodiments, borrowers 101-105 may each agree to provide the mandatory attributes of updated financial disclosure data 124 on an annual basis, in exchange for more favorable loan terms, such as lower interest rates, at the time the loans are initially funded.

At step S602, loan processor 112 may store first payment data for the loans. For example, loan processor 112 may store first interest rate 301 and monthly payment 302 of payment term data 122, which reflect the interest rate and monthly payments agreed to by the borrowers when the loans were funded. Note that, as shown in FIG. 2, each of the loans may be a 30-year mortgage. In some embodiments, the payment terms for loans 1-5, e.g., first interest rate 301 and monthly payment 302, are lower than the payment terms for a "conventional" 30-year mortgage that does not require reporting of updated financial data on an annual basis. In such embodiments, borrowers may have an incentive to agree to agree to the mandatory financial disclosures associated with loans 1-5.

At step S603, loan processor 112 may store second payment terms for the loans. For example, loan processor 112 may store second interest rate 303 and secondary monthly payment 304, which reflect the interest rates and payments that the borrowers may be required to pay in a given year if they fail to provide the mandatory financial disclosures for the previous year. For example, as shown in FIG. 3, borrowers may pay a higher interest rate (e.g., 1% higher) in years when they fail to provide the previous year's mandatory disclosures.

At step S604, loan processor 112 may determine whether a borrower has provided the mandatory financial disclosures for a given year. For example, in the year 2010, loan processor 112 may determine whether borrowers 101-105 have each provided the mandatory financial disclosures for the previous year, 2009. As shown in FIG. 5, for example, borrower 101 has provided the mandatory financial disclosures for 2009, whereas borrower 102 has not, as indicated by the "not reported" fields of updated financial disclosure data 124 for borrower 102 in 2009.

At step S605, loan processor 112 may select either the first or second payment terms for borrowers 101-105. For example, because borrower 101 has provided the mandatory attributes for 2009, loan processor 112 may select payment terms such as first interest rate 301 and monthly payment 302 for the year 2010. In contrast, because borrower 102 has not provided the mandatory attributes, loan processor 112 selects second interest rate 303 and monthly payment 304 for the year 2010. Thus, during 2010, borrower 101 may continue to pay their initially agreed-to interest rate and monthly payment, because they have provided the mandatory attributes. In contrast, borrower 102 has not provided the mandatory attributes, and may be required to pay a higher interest rate and monthly payment than they would otherwise, e.g., second interest rate 303 and monthly payment 304.

In some embodiments, loan processor 112 may use additional criteria to determine whether to apply the first or second payment terms for a given borrower. For example, borrowers whose loans are not in good standing, e.g., payment obligations are not being met by the borrower, may be required to pay monthly payment 304. In addition, the borrower may be required to meet certain financial goals to qualify for monthly payment 302. For example, borrowers may be required to maintain a credit score above a predetermined threshold, limit their monthly debt obligations to a specified percentage of their income, or limit prepayments on their loans to a predetermined percentage of their loan values to obtain the benefit of monthly payment 302.

At step S606, loan processor 112 may process loan data 121 consistently with the selected payment terms. For example, loan processor 112 may transmit data to servicer 150 indicating that borrower 101 has provided the mandatory attributes, and will be required to pay according to first interest rate 301 and monthly payment 302 during 2010. Similarly, loan processor 112 may transmit data to servicer 150 indicating that borrower 102 has not provided the mandatory attributes, and will therefore be required to pay according to second interest rate 303 and monthly payment 304 for 2010.

Note that other attributes of loan data 121 may also be affected by the selected payment terms. For example, selecting second interest rate 303 for borrower 102 may affect the amortization schedule for loan 2, for example by extending remaining term 206. Furthermore, during the year 2010, remaining balance 204 may change each month as borrowers 101 and 102 make their monthly payments and a portion of each payment is applied to the loan principal. However, because borrower 102 is paying a higher interest rate, the amount of each payment applied to principal may differ from the amortization schedule associated with first interest rate 301.

As discussed above, borrowers may also choose to provide certain optional financial disclosures in a given reporting period. Borrowers who do so may receive favorable treatment during the next reporting period, such as a lower interest rate on their loan. For example, consider borrowers 104 and 105, and FIG. 5. For 2009, borrowers 104 and 105 provided the mandatory attributes of updated financial disclosure data 124, and thus, like borrower 101, qualify for the lower first interest rates 301 and monthly payments 302 that they originally agreed to when they took out the loan.

However, borrowers 104 and 105 also provided certain optional disclosures for 2009. As shown in FIG. 5, borrowers 104 and 105 authorized the GSE to check their credit score, as reflected by the "Reported" value of credit flag 506. Borrowers 104 and 105 also reported their occupation, as reflected by the "Reported" value of occupation flag 507, and provided and/or authorized the GSE to obtain a copy of their tax return, as reflected by the "Reported" value of tax return flag 508. Because borrowers 104 and 105 provided all three of these optional disclosures for 2009, loan processor 112 will process their loans so that these borrowers receive the more favorable terms of third interest rate 305 and monthly payment 306, rather than the originally-agreed to first interest rate 301 and monthly payment 302.

In some embodiments, borrowers may not be required to provide all the optional disclosures in order to receive some discount. For example, if borrower 105 did not provide their occupation for 2009, but allowed a credit check and provided their tax return, the discount associated with third interest rate 305 (relative to first interest rate 301) may be prorated, e.g., to ⅔ or some other value determined by the financial entity, because borrower 105 provided ⅔ of the optional disclosures. Assuming a 0.5% discount in such a circumstance, borrower 105 would receive a (⅔)*(0.5%)=0.33% discount for 2010. Likewise, if borrower 105 had only provided a tax return, but refused a credit check and not provided their occupation, borrower 105 may receive, e.g., a (⅓)*(0.5%)=0.167% interest rate reduction.

In still further embodiments, the benefits associated with the optional disclosures may differ for each optional disclosure. For example, if the GSE determines that credit reports are twice as valuable at predicting loan delinquencies and/or prepayments than occupation information, the GSE may provide a correspondingly higher discount for allowing the credit check, e.g., a 0.2% discount for allowing a credit check, and a 0.1% discount for providing occupation information. In still further embodiments, each optional disclosure may have an associated discount, e.g., 0.1% for credit 506 and occupation 507, and 0.2% for tax return 508. However, borrowers may be provided with an additional "kicker" incentive discount of 0.1% when they provide all three optional attributes 506-508 for a given year, for a total discount of 0.5%.

In embodiments where borrowers obtain discounts for providing optional disclosures, server 110 may transmit a communication to borrower 140 indicating that they will receive a discount if they provide the optional disclosures. Alternatively, server 110 may transmit data indicating the discount is available to servicer 150, who in turn informs borrower 140 that they may qualify for the discount. In embodiments where borrower 140 receives paper-based statements and other loan correspondence, loan processor 112 may perform automated processes to cause paper correspondence to be sent to borrower 140, informing them of the discount. For example, the GSE may send the paper correspondence directly to borrower 140, or transmit information about the discount to servicer 150, who in turn provides the paper correspondence to the borrower.

Mandatory attributes 502-505 and optional attributes 506-508 are exemplary, and other financial information from borrowers can be used in place of or in addition to the attributes shown in FIG. 5. For example, one or more of attributes 506-508 may be treated as mandatory attributes, instead of or in addition to attributes 502-505. In such embodiments, borrowers may agree when initially applying for a loan to provide, on a yearly basis, all of the mandatory financial disclosures. In other embodiments, no disclosures may be "mandatory," and borrowers may be provided with the option, each year, of providing attributes 502-508, and receiving a corresponding discount.

In still further embodiments, the discounts associated with optional disclosures may be varied from year to year according to a predetermined schedule, or at the option of the GSE. For example, the GSE may offer a 0.05% discount in the first two years of the loan, for authorizing the GSE to do a credit check on the borrower. The GSE may discontinue this discount for the third through fifth years and resume the discount periodically thereafter. In addition, the GSE may decide, in 2009, to increase the discount to 0.1%. The GSE may choose to do so because, for example, not enough borrowers were agreeing to the credit check in return for the 0.05% discount in 2007 and 2008. Alternatively, the GSE may decide to decrease the discount to 0.025%. For example, if virtually all borrowers are agreeing to the credit check for the 0.05% discount, the GSE may expect that very few borrowers will stop agreeing to the credit checks if the discount is reduced to 0.025%.

Updated financial disclosure data 124 may reflect virtually any financial information for a borrower in a given year, for example by adding the information as mandatory or optional attributes to updated financial disclosure data 124. For example, borrowers may report information about their salary or other income, as may appear in tax returns, e.g., commissions, bonuses, overtime, auto allowances, military employment (e.g., part-time reservists), second jobs, seasonal employment, unemployment compensation, tips, notes receivable, dividends or interest, trusts, capital gains, royalty payments (e.g., patents, copyrights), public assistance, foster care payments, alimony, child support, home ownership assistance payments, and housing allowances.

Updated financial disclosure data 124 may also reflect various costs that a borrower incurs during a given year. Examples include debt payments such as auto or boat loans, mortgages on second homes or other real estate, credit cards, student loans, small business loans, or other debt payments. Other examples of costs include medical expenses, home repair costs (for example due to a disaster such as a flood, hurricane, fire, or earthquake), alimony or child support owed to a former spouse, legal costs (e.g., attorney or court filing fees), lawsuit outcomes (e.g., a civil settlement, criminal fine, or loss of employment due to jail time), loss of a job, or taking a lower paying job.

In addition to reporting information about income and costs for a given year, borrowers may also report information about changes in their assets that affect their wealth, but not necessarily their cash flow, for a given year. Examples include appreciation or depreciation of real estate or other investments such as 401 k, IRA's, savings, bonds, CD's, or assets such as vehicles, collectibles (art, stamps, etc.), company ownership such as stocks or ownership interest in an LLC, commodities such as metals, oil, grain, etc., stock futures or options, or other assets. Such investments may not directly affect a borrower's ability to pay in the same way as changes to their income or debt payments, but the borrower's relative wealth may affect their willingness to continue paying their mortgage. Of particular interest, for example, may be the value of the property securing the loan. In some embodiments, the GSE may use automated processes such as automated valuation tools to estimate the value of the property securing the loan, or in some cases may even request that the borrower agree to an in-person appraisal of the property.

In some embodiments, the information discussed above for updated financial disclosure data 124 may be provided directly by borrower 140. In further embodiments, the information is collected by servicer 150, and provided by servicer 150 to the GSE. In still further embodiments, servicer 150 or the GSE may take certain steps to verify the information. For example, borrower 140 may provide certain documentation to verify the disclosed information. For salary information, the borrower may provide W-2 forms or other accounting documents. Likewise, for investment income, borrowers may provide dividend statements (e.g., 1099 forms), for alimony or child support, the borrower may provide cancelled checks or legal paperwork stating the financial obligations of a former spouse. Similarly, borrowers may substantiate their debt obligations and/or changes in assets by providing statements or other paperwork that establish the veracity of the financial disclosures.

In still further embodiments, the GSE or servicer 150 may take certain steps to verify the information provided by borrower 140. For example, the borrower's reported salary may be compared to salary information for other individuals in the same profession and geographical location, to determine whether the reported salary is consistent with salaries for similar professions in the borrower's location.

Each of the various disclosures discussed above can be applied on a sliding scale to determine the interest rate and mortgage payment for a given borrower. For example, borrowers who agree to provide extensive financial disclosures on an annual basis may be provided with a relatively substantial interest rate reduction, e.g., 1.0%. Borrowers who agree to fewer financial disclosures (e.g., to provide income information but not debt information) may receive a correspondingly lower reduction, e.g., 0.5%. These disclosures may be mandatory disclosures, in which case the borrower agrees at the time the loan is initially funded to provide the disclosures over the life of the loan. In other embodiments, the disclosures may be optional, and each year the borrower provides the disclosures, they may receive the discount. In some embodiments, the interest rate deduction associated with optional disclosures may be established at the time the loan is originally funded. In further embodiments, the GSE may offer the deduction at any time during the repayment period of the loan.

Furthermore, in the embodiments discussed above, loans 1-5 were all 30-year mortgages. However, embodiments of the invention include other types of loans, such as loans with shorter or longer repayment terms, interest-only loans, adjustable-rate mortgages ("ARMs"), or other loan products. Note that method 600 may be applied to ARM loans by adjusting the interest rate and mortgage payment for a given year relative to the rate that would otherwise apply for the ARM. Thus, for example, if loan 1 were an ARM that had a 5% interest rate during an initial, fixed-rate term, and subsequently reset in 2011 to a 6% interest rate, first interest rate 301 for the loan may be 6% in 2011, second interest rate 303 for the may would be 7% in 2011, and third interest rate 305 may be 5.5% for the loan in 2011.

Modifying Existing Loans

In the embodiments discussed above, loans were funded based on a contractual agreement between the borrower and the lender to provide certain mandatory disclosures during the repayment period of the loan. Thus, during the entire repayment period, the borrowers were potentially obligated to one of several sets of repayment terms, depending on whether they provided the mandatory disclosures on an annual basis.

In some embodiments, processing similar to that discussed above with respect to method 600 can be applied to existing loans that were not originally funded with a mandatory disclosure requirement. For example, consider loan data 121 in FIG. 2. Instead of loans 1-5 having been originally funded based on an agreement to provide the mandatory disclosures, loans 1-5 may have originally been funded as conventional loans with one set of repayment terms. For example, borrowers 101-105 may have initially agreed to pay second interest rate 303 and corresponding monthly payment 304 for the life of the loans, e.g., in 2005, the year each of these loans was originally funded.

In 2006, the GSE may have purchased each of these conventional loans from lender 130. At this time, the GSE may decide to offer certain incentives to borrowers 101-105 to provide financial disclosures on an annual basis, even though these disclosures were not required by the original loan terms. To do so, the GSE may modify the initial loan payment terms of the existing loans.

Figure 7:
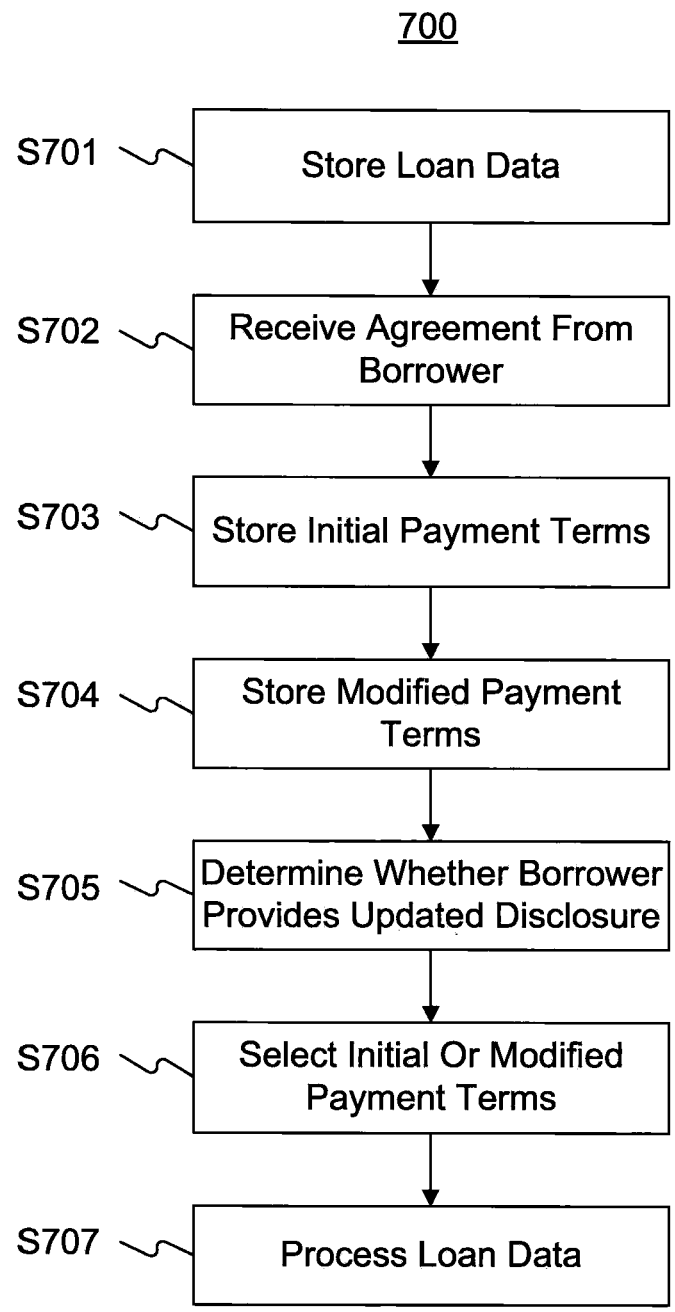
FIG. 7 illustrates a flowchart of an exemplary method, consistent with certain embodiments of the invention.

FIG. 7 illustrates an exemplary method 700 for modifying payment terms of existing loans, consistent with certain embodiments of the invention. Method 700 may be implemented by loan modifier 113 of server 110. At step S701, loan modifier 113 may store loan data. For example, when lender 130 funds a loan to borrower 140, lender 130 may sell the loan and provide associated data to the GSE via network 180 or another communication channel. At this time, loan modifier 113 may store the data as loan data 121 for the loan. At this time, the loans may be conventional loans with no incentives or obligations to provide financial disclosures. At step S701, loan modifier 113 may also store second interest rate 303 and monthly payment 304 in payment term data 122. Second interest rate 303 and monthly payment 304 may be the initial loan terms agreed to by the borrower for the conventional loan.

At step S702, the borrowers agree to provide certain financial disclosures in exchange for better loan terms, e.g., lower interest rates and/or monthly payments. For example, borrowers 101-105 may each agree to provide the mandatory attributes of updated financial disclosure data 124 on an annual basis, in exchange for more favorable loan terms, such as first interest rate 301 and monthly payment 302, reflected in payment term data 122.

At step S703, loan modifier 113 may store initial payment data for the loans. For example, loan modifier 113 may store second interest rate 303 and monthly payment 304 of payment term data 122, which may reflect the interest rate and monthly payments agreed to by the borrowers when the loans were funded as conventional loans. Thus, second interest rate 303 and monthly payment 304 may reflect the "original" payment obligations of the borrowers. In some embodiments, borrowers 101-105 may be required to pay second interest rate 303 and monthly payment 304 in any year where they fail to provide the mandatory attributes of updated financial disclosure data 124 for the previous reporting period (e.g., the previous year).

At step S704, where loan modifier 113 may store modified payment data for the loans. For example, loan modifier 113 may store first interest rate 301 and monthly payment 302, which reflect the lower interest rates and payments that the borrowers may be required to pay in a given period when they provide the mandatory financial disclosures for the previous reporting period, as agreed to at step S702.

At step S705, loan modifier 113 may determine whether a borrower has provided the mandatory financial disclosures for a given reporting period. For example, in the year 2010, loan modifier 113 may determine whether each of borrowers 101-105 has provided the mandatory financial disclosures for the previous year, 2009. As shown in FIG. 5, borrower 101 has provided the mandatory financial disclosures for 2009, whereas borrower 102 has not, as indicated by the "Not Reported" fields of updated financial disclosure data 124 for borrower 102 in 2009 as shown in FIG. 5.

At step S706, loan modifier 113 may select either the initial (303 and 304) or the modified (301 and 302) payment terms for borrowers 101-105. For example, because borrower 101 has provided the mandatory attributes for 2009, loan processor 112 may select payment terms such as first interest rate 301 and monthly payment 302 for the year 2010. In contrast, because borrower 102 has not provided the mandatory attributes, loan processor 112 may select second interest rate 303 and monthly payment 304 for the year 2010. Thus, during 2010, borrower 101 will pay the modified, incentivized interest rate and monthly payment, because they have provided the mandatory attributes. In contrast, borrower 102 has not provided the mandatory attributes, and will be required to pay a higher interest rate and monthly payment than they would otherwise, e.g., the interest rate and payment associated with their original, conventional loan agreement.

At step S707, loan modifier 113 may process loan data 121 consistently with the selected payment terms. For example, loan processor 112 may transmit data to servicer 150 indicating that borrower 101 has provided the mandatory attributes, and will be required to pay according to first interest rate 301 and monthly payment 302 for 2010. Similarly, loan processor 112 may transmit data to servicer 150 indicating that borrower 102 has not provided the mandatory attributes, and will be required to pay according to second interest rate 303 and monthly payment 304 for 2010.

In the embodiment discussed above, the repayment terms for a borrower who failed to provide updated mandatory financial disclosures for a given year were the original conventional loan terms. However, in some embodiments, the repayment terms for borrowers who fail to provide the mandatory disclosures are not necessarily the same repayment terms they originally agreed to when obtaining the conventional loan. Rather, the borrower may be required to pay an even higher interest rate and corresponding payment than required by the original loan terms. In still further embodiments, the repayment terms for borrowers who fail to provide the mandatory disclosures are still lower than the original loan terms, but higher than they would be had the borrowers provided the mandatory disclosures.

Except for the differences discussed above between method 700 and method 600, the two methods may be implemented in a similar fashion. Thus, certain processing discussed above with respect to method 600 may be applied using method 700 to modify existing loans. For example, payments and interest rates may be varied depending on whether a borrower provides certain optional disclosures in a given year, and the amount of the incentive to the borrower may depend on which optional disclosures are provided. Furthermore, the optional incentives for a given year may be varied from the previous year, for example, depending on the relative value of the information from the perspective of the GSE.

Furthermore, processes such as transmitting data or sending paperwork or other communications to borrower 140 and/or servicer 150 may be implemented by server 110 to inform the borrower of the discounts they will receive in the next year for providing the optional disclosures. Moreover, the income, debt, and asset information discussed above with respect to method 600 may be used in method 700 as well to populate updated financial disclosure data 124, and these attributes may be used as mandatory or optional disclosures consistent with the description of method 700 herein. In addition, verification processes discussed above, such as obtaining documentation to validate financial disclosures, may also be performed consistently with method 700. Method 700 may also be applied to loans of various terms, interest-only loans, and ARM loans in a manner similar to that discussed above.

Processing of Mortgage-Backed Securities ("MBS's")

Generally speaking, mortgage-backed securities are securities that can be purchased by investors to obtain an interest in a group of mortgages. Typically, a group of loans, such as mortgages, are grouped together to create an MBS, and investors can purchase part of the MBS to obtain a proportional share of the income received from the MBS. By purchasing the MBS, an investor may be entitled to receive principal from the underlying loan payments, interest from the underlying loan payments, or both. However, because conventional mortgages only have one set of payment terms regardless of any disclosures provided by the borrowers, conventional methods for administering an MBS do not account for any changes in payment terms that may arise as a result of a borrower providing, or failing to provide, such financial disclosures.

As discussed, server 110 includes a security engine 114 for administering an MBS. Generally speaking, security engine 114 stores data identifying loans that underlie certain MBS's. The loans may be loans such as those discussed above with respect to method 600, e.g., loans that were originally funded with at least two sets of payment terms dependent upon certain disclosures by the borrower after the loans are funded. Alternatively, the loans may be loans such as those discussed above with respect to method 700, e.g., loans that were originally funded as conventional loans and subsequently modified to have at least two sets of payment terms dependent upon certain borrower disclosures. Security engine 114 may administer an MBS backed by either type of loan such that the income an investor receives from the MBS is dependent on whether the borrowers on the loans provide certain financial disclosures.

FIG. 8 illustrates exemplary security data 125, as stored on server 110. As shown in FIG. 8, security data 125 may include an MBS ID 801, which uniquely identifies an MBS. In some embodiments, MBS ID 801 may be a CUSIP ("Committee on Uniform Security Identification Procedures") number, or other such identifier used in financial markets to identify securities. Security data 125 may also include loan IDs 201, which identify the loans that are grouped together to form a given MBS. In FIG. 8, for example, loans 1-3 are grouped together to form MBS 1, and loans 4 and 5 are grouped together to form MBS 2. Those skilled in the art will appreciate that many more loans may be aggregated to form an MBS than are illustrated here for exemplary purposes, and, as discussed above, that the loans may include loans of various repayment terms, interest-only loans, and ARMs.

Security data 125 may also include interest rates for the corresponding loans for a particular year. For example, security data 125 is shown with a 2010 rate 802, which reflects the interest rate that borrowers will be charged on the corresponding loan for the year 2010, based on which, if any, disclosures the borrowers provided in 2009. Returning to the example data in FIG. 8, because borrowers 101 and 103 (for loans 1 and 3, respectively) provided only the mandatory disclosures for 2009, the 2010 interest rate for loans 1 and 3 are 5% and 5.5%, respectively, taken from first interest rate 301 of payment term data 122. Likewise, because borrower 102 of loan 2 did not provide the mandatory disclosures for 2009, the 2010 interest rate 802 for loan 2 is 7%, e.g., taken from second interest rate 303 of payment term data 122. Similarly, borrowers 104 and 105 provided both optional and mandatory disclosures for 2009, so the 2010 interest rate 802 for loans 4 and 5 are 6% and 3.5%, respectively, taken from third interest rate 305 of payment term data 122.

Security data 125 may also include original balance 203 for each of the loans, and total original balance 803, which reflects the sum of the original balances for each loan underlying the MBS. Security data 125 may also include a loan weight 804, which reflects the percentage of each loan's original balance relative to the total original balance. In FIG.

8, for example, loan 1's original balance of $100,000 is 16.67% of the total original balance of $600,000 for MBS 1, and loan 5's original balance of $400,000 is 66.67% of the total original balance of $600,000 for MBS 2. Security data 125 may also include an average interest 805, which is the weighted average of the interest rates of each of the loans underlying the MBS. The calculation of average interest 805 will be discussed in more detail below.

Figure 9:
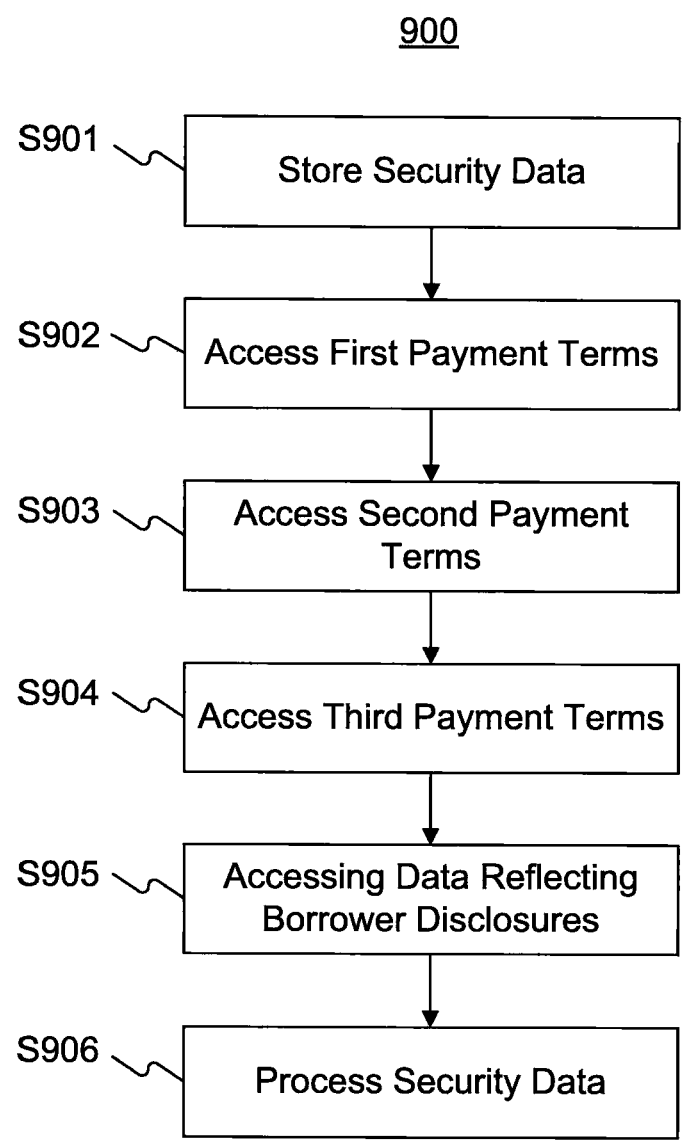
FIG. 9 illustrates a flowchart of an exemplary method, consistent with certain embodiments of the invention.

FIG. 9 illustrates an exemplary method 900 for administering an MBS. At step S901, security engine 114 may store security data identifying a group of loans underlying an MBS, such as MBS ID 801 and loan ID 201 of security data 125. In some embodiments, loans 1-3 are selected for MBS 1 because loans 1-3 have a combined original balance of $600,000 and a weighted average risk score in the range of 10 to 15. Also loans 4-5 are selected for MBS 2 because loans 4-5 have a combined original balance of $600,000 and a weighted average risk score in the range of greater than 15 and less than equal to 20. Note that the individual risk scores and loan weights are different in MBS1 and MBS2. It is to be understood by those skilled in the art that in further embodiments, techniques such as weighted-average coupon (WAC) and weighted-average maturity (WAM) may be used in combination with the weighted risk score to form MBS securities. At step S902, security engine 114 may access first payment terms for the loans. For example, security engine 114 may access first interest rate 301 of payment term data 122 to determine the interest rate of each of the loans underlying MBS 1 and MBS 2 when the borrowers provide the mandatory disclosures.

At step S903, security engine 114 may access second payment terms for the loans. For example, security engine 114 may access second interest rate 303 of payment term data 122 to determine the interest rate for each of the loans underlying MBS 1 and MBS 2, when the borrowers do not provide the mandatory disclosures.

At step S904, security engine 114 may access third payment terms for the loans. For example, security engine 114 may access third interest rate 305 of payment term data 122 to determine the interest rate for each of the loans underlying MBS 1 and MBS 2, when the borrowers provide both the mandatory and optional disclosures.

At step S905, where security engine 114 may access data reflecting borrower disclosures for a given year, for example, 2009. Security engine 114 may, for example, receive data from loan processor 112 or loan modifier 113 indicating which, if any, disclosures have been provided by the borrowers for 2009. Alternatively, security engine 114 may instead receive the 2010 interest rates determined by loan processor 112 or loan modifier 113 for each of the loans. Note that the interest rates for 2010 may reflect which, if any, disclosures have been provided by the borrowers, because the interest rates may vary depending on which disclosures are provided.

At step S906, security engine 114 may process the security data such that the payments on the MBS are based on the income from the loans. For example, the payments on an MBS may be based on the weighted average of the interest rates for the loans underlying the MBS. Thus, at step S906, security engine 114 may calculate weighted average interest rate 805 for MBS 1 and MBS 2. Generally speaking, the weighted average interest rate 805 may be calculated for an MBS for the year 2010 by multiplying loan weight 804 by 2010 interest rate 802 for each of the loans, and summing the result. In FIG. 8, for example, weighted average interest rate 805 for loans 1, 2, and 3 comprising MBS 1 is 5.92%. This is based on first interest rate 301 for loans 1 and 2 (5% and 7%), because borrowers 101 and 102 provided only the mandatory disclosures, and on second interest rate 303 for loan 3 (5.5%), because borrower 103 failed to provide the mandatory disclosures.

Likewise, the weighted average interest rate 805 for MBS 2 in FIG. 8 is 4.33%. This is based on third interest rate 305 for loans 4 and 5 (6% and 3.5%), because borrowers 104 and 105 provided both the mandatory and optional disclosures for 2009.

As discussed above with respect to method 600, in some embodiments, second monthly payment 304 may include a penalty fee component that is separate from the increased payment that would result solely from an increase in the interest rate. In such embodiments, the penalty fee may or may not be applied when applying method 900, e.g., the income received by an MBS investor may or may not include any penalty fees associated with the borrower's failure to provide certain disclosures.

Furthermore, the income received by an investor may not necessarily be directly based on the weighted average interest rate alone. Rather, investors may also receive a portion of loan payments that are applied to loan principal. Furthermore, the GSE may charge a servicing fee for administering the MBS. This fee may be either a flat fee, e.g., $50 per month for every $10,000 investment in the MBS, or as a percentage reduction (e.g., 0.05%) off of the weighted average interest rate for the MBS.

In some embodiments, the MBS's may be divided into several "tranches," and each tranche may be sold by the GSE as a separate security to investor 170. For example, MBS 1 may be divided into three prepayment tranches—a junior tranche, middle tranche, and senior tranche, each corresponding to ⅓ of total original balance 203, e.g., $200,000 per tranche. Any prepayments on the underlying loans (1, 2, and 3) may be applied first to the junior tranche, next to the middle tranche, and finally to the senior tranche. Thus, until $200,000 of prepayments may be applied to the junior tranche, the middle and senior tranches receive no prepayments. Likewise, until $400,000 of prepayments are received, the senior tranche receives no prepayments.

Because the junior tranche gets the prepayments applied first, the investors in the junior tranche essentially have a shorter-term investment than the investors in the middle and senior tranches. For this reason, investing in the junior tranche may be considered a relatively low-risk investment, because investors in the junior tranche are less likely to forego better investing opportunities in the future. For example, if interest rates rise substantially after the junior tranche is prepaid but before the middle or upper tranches are prepaid, the investors in the junior tranche will not have their funds tied up in the MBS, whereas the investors in the middle and senior tranches will still have their funds committed to the investment in the MBS, and therefore be unable to take advantage of investment opportunities at the higher interest rates.

For this reason, in some embodiments, the junior tranche may pay a correspondingly lower interest rate than the middle tranche, and the senior tranche may pay a correspondingly higher interest rate than both the middle and bottom tranches. For example, the junior tranche may pay a 0.5% lower interest rate than the middle tranche, the middle tranche may pay the weighted average interest rate 805 for the MBS, and the senior tranche may pay 0.5% higher interest rate than the middle tranche. As discussed above, the weighted average interest rate for MBS 1 is 5.92%, so the junior tranche would pay 5.42%, the middle tranche would pay 5.92%, and the senior tranche would pay 6.42%, in such an embodiment.

In further embodiments, tranches may be defined in a manner similar to that discussed above to apply losses to the MBS. In such an embodiment, the junior tranche would receive the losses first, and once $200,000 of losses are applied to the junior tranche, the losses are then applied to the middle tranche, and likewise, once $400,000 of losses are applied to the MBS, the losses are applied to the senior tranche. In such embodiments, investors in the junior tranche have the highest risk of losses, so the junior tranche may pay a correspondingly higher interest rate, e.g., 0.5% more than weighted average interest 805, e.g., 6.42% for MBS 1. Likewise, the middle tranche may pay the weighted average interest 805, e.g., 5.92% for MBS 1, and the senior tranche may pay 0.5% less, e.g., 5.42%.

Note that the tranche schemes discussed above may have different interest rates from year to year. This is because the interest rates on the underlying loans vary with whether the corresponding borrowers have provided mandatory and/or optional disclosures. Thus, the interest rate that an investor receives in a given year is not only based on the tranche in which they invest, but also on which, if any, disclosures the borrowers on the loans provide for the previous year.

In still further embodiments, the MBS may be split into interest-only and principal-only securities, and the interest-only and principal-only securities may be divided into tranches. In some such embodiments, the principal-only securities may be offered by the GSE at a fixed interest rate, because the principal payments may not vary with the borrower disclosures. In contrast, the interest-only securities would vary with the borrower disclosures in the manner discussed above.

Evaluating Default/Prepayment Risk

For various reasons, it may be useful to evaluate the risk that a particular loan will default, or be prepaid either partially or in full. From the perspective of the party that owns the loan (e.g., the GSE), the owner may be able to take certain steps to mitigate costs associated with the defaults or prepayments. For example, if a loan has a particularly high risk of default, it may be desirable to modify the terms of the loan to make it easier for the borrower to continue paying, for example using method 600 as discussed above. As another example, the owner of the loan may decide to take out protection on the loan, such as by purchasing mortgage insurance or enter a contract for a credit default swap ("CDS").

As discussed above, in certain embodiments, borrowers provide updated financial disclosures after their loans are funded, during the repayment period. These disclosures may occur on a periodic basis, for example, annually. By processing updated financial disclosures from the borrowers, it is possible to perform more refined risk analysis for the loans than would be possible using only the borrowers' initial financial disclosures.

Server 110 includes a risk engine 115, which may evaluate the risk that a particular loan will have a payment event such as a prepayment or default. Generally speaking, risk engine 115 may process the borrowers' updated financial disclosures to analyze the risk that the borrower will default or prepay. For example, risk engine 115 may apply mathematical techniques to the borrowers' mandatory disclosures, optional disclosures, or both on a recurring annual basis to provide insight as to the likelihood that the loans will have defaults or prepayments in the following year. Such mathematical techniques are well known in the art.

FIG. 10 illustrates an exemplary tax bracket table 1000, which may be created by risk engine 115 to analyze the relative risk of default for the loans identified in loan data 121. Generally speaking, each row of tax bracket table 1000 corresponds to a combination of U.S. federal tax filing status and a tax bracket. Tax bracket table 1000 may include a filing status attribute 1001, which may identify the status for the year identified by tax year 1002. Minimum taxable income attribute 1003 identifies the minimum taxable income for a particular tax bracket, and maximum taxable income attribute 1004 identifies the maximum taxable income for the same tax bracket. Tax bracket percentage ("TBP") attribute 1005 corresponds to the tax bracket for individuals who fall within the income ranges defined by minimum taxable income 1003 and maximum taxable income 1004.

Thus, using the data in FIG. 10, for tax year 2009, a single filer with a taxable income between $0 and $8,350 falls in the 10% tax bracket, a single filer with a taxable income between $8,351 and $33,950 falls in the 15% tax bracket, etc. Likewise, a married individual who files jointly with their spouse and has a taxable income between $0 and $16,700 falls in the 10% tax bracket, a married individual who files jointly with their spouse and has a taxable income between $16,701 and $67,900 falls in the 15% tax bracket, etc. Although not shown in FIG. 10, rows can also be defined for married filing separately, head of household, and qualifying widow(er) tax statuses.

Tax bracket table 1000 may also include a property weight factor (PWT) attribute 1007. P T attribute 1007 may be calculated by taking the sum of maximum taxable income 1004 for a particular filing status, and dividing it by the sum of the tax bracket percentage attribute 1005 for the filing status. Thus, as can be seen from FIG. 10, PWT 1007 has a value of 7136.99 for single filers in the year 2009, and a value of 8057.54 for married filers who file joint returns in 2009.

Note that PWT attribute 1007 would have a lower value if tax rates were increased for a given filing status, e.g., if the tax rates for single filers for 2009 were doubled, PWT attribute 1007 would be ½ of it's value, or approximately 3,568.5. Thus, PWT attribute 1007 provides information about the relative tax burden for a given filing status, and the lower PWT value, the higher the tax burden. Because married/joint filers in 2009 have a higher PWT value than single filers, they have a correspondingly lower tax burden on a per-dollar of income basis.

After calculating PWT attribute 1007 for each filing status, risk engine 115 may determine risk score attribute 1006 for each tax bracket. Risk score attribute 1006 may be calculated by multiplying each tax bracket percentage 1005 by the square of PWT and dividing the result by 100,000,000. Thus, the risk score for single filers in the 10% tax bracket is 5.09, for single filers in the 15% tax bracket is 7.64, etc. Likewise, the risk score for married/joint filers in the 10% tax bracket is 6.49, for the 15% tax bracket is 9.74, etc.

Generally speaking, a higher risk score may correspond to a lower likelihood of default, and a higher likelihood of prepayment. Note that risk score attribute 1006 generally increases as a borrower's tax bracket increases. Tax bracket percentage 1005 may serve as a proxy for the borrower's income. Thus, borrowers with higher tax bracket percentages generally have higher income than borrowers with lower tax bracket percentages. Moreover, as borrowers with higher income are generally in a better position to pay their loan obligations than borrowers with lower incomes, their risk scores rise accordingly.

As discussed above, risk score 1006 takes into account two separate factors for each tax bracket/filing status combination, e.g., PWT and tax bracket percentage. The PWT generally reflects the relative tax burden for a given filing status, and the tax bracket generally corresponds to the borrower's income. Thus, risk score 1006 reflects a combination of the borrower's tax burden and income level, with higher scores reflecting a lower tax burden relative to the borrower's income.

Figure 11:
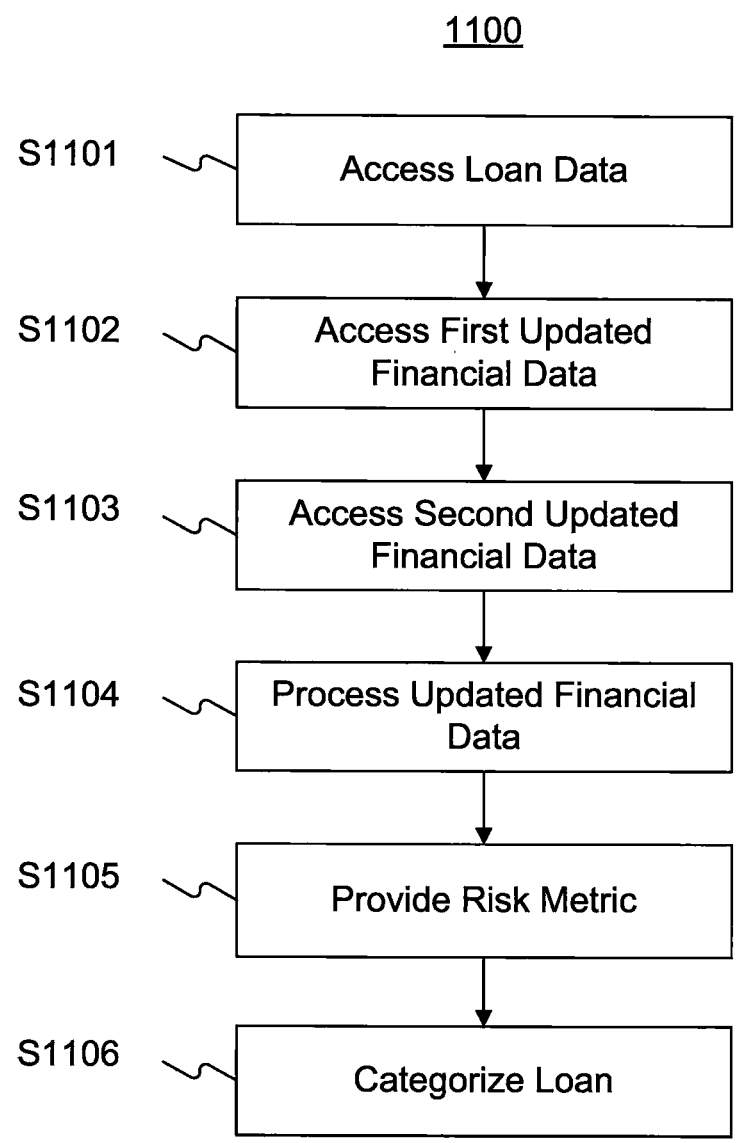
FIG. 11 illustrates a flowchart of an exemplary method, consistent with certain embodiments of the invention.

FIG. 11 illustrates an exemplary method 1100 for evaluating the risk of payment events, such as defaults or prepayments, on a loan. At step S1101, risk engine 115 may access loan data. For example, when evaluating loan 1, risk engine 115 may access loan data 121 for loan 1, and determine the corresponding borrower ID 101.

At step S1102, risk engine 115 may access first updated financial data for the borrower of the loan being evaluated. For example, risk engine 115 may access filing status attribute 502 and tax bracket percentage 503 for borrower 101. For the purposes of this example, risk engine 115 is evaluating loan 1 for the year 2010, and uses borrower 101's financial disclosures for the years 2008 and 2009. Thus, referring to FIG. 5, risk engine 115 will determine that, for 2008, borrower 101 reported a filing status of "single" and a tax bracket percentage of 15%.

At step S1103, risk engine 115 may access second updated financial data for the borrower of the loan being evaluated, for the year 2009. Thus, referring to FIG. 5, risk engine 115 will determine that, for 2008, borrower 101 reported a filing status of "married" and a tax bracket percentage of 10%.

Next, method 1100 moves to step S1104, risk engine 115 may process the first updated financial data and the second updated financial data to develop a risk metric, such as risk score 1006, for the borrower. For example, risk engine 115 may access tax bracket table 1000 for the first and second updated financial disclosure data, for 2008 and 2009, respectively. Thus, because borrower 101's filing status was "single" for 2008 and they fell in the 15% tax bracket, the risk score for 2008 is 7.64. Likewise, because borrower 101's filing status changed to "married/joint" in 2009 while they changed to the 10% tax bracket, borrower 101's risk score for 2009 is 6.49. Note that, in some embodiments, tax brackets may change on a yearly basis, but for the purposes of this example tax bracket table 1000 is used for both 2008 and 2009.

At step S1105, risk engine 115 may provide the risk metrics to a user. For example, server 110 may display the risk scores for borrower 101 on a display locally at server 110, or by transmitting the risk scores for display on a remote terminal such as any of devices 130, 140, 150, 160, and 170 connected to network 180 in FIG. 1. By viewing the displayed risk scores, a user may compare the borrower's risk scores for 2008 and 2009. In further embodiments discussed below, risk engine 115 may perform more refined processing to categorize loans by default and/or prepayment risk, based on the borrower's risk score for a given year, or changes to their risk score over time.

In some embodiments, each loan may have one or more co-borrowers. In such embodiments, risk engine may calculate the average risk score of all of the co-borrowers, and provide the average score at step S1105. For example, if loan 1 included a second borrower with a risk score for 2009 of 5.09 (e.g., a single filer in the 10% tax bracket), the risk score for loan 1 would be 5.79, i.e., the average of borrower 101's risk score of 6.49 and the co-borrower's risk score of 5.09.

At step S1106, risk engine 115 may categorize the loan for default or prepayment risk based on the risk score. For example, risk engine 115 may categorize the loan into one of three categories: default risk, prepayment risk, or no change. The default risk category may correspond to loans that are expected to have an increased risk of default relative to the previous year. Likewise, the prepayment risk category may correspond to loans that are expected to have an increased risk of prepayment relative to the previous year. The no change category may correspond to loans that are not expected to have increased risk of prepayments or defaults relative to the previous year.

Risk engine 115 may also provide the risk categorization of the loan to a user at step S1106, for example by displaying information identifying the risk category of the loan on a display locally at server 110, or transmitted such information for display on a remote terminal such as any of devices 130, 140, 15, 16, and 170 connected to network 180 in FIG. 1. Thus, for example, if loan 1 is categorized as having a default risk, information identifying loan 1 as a default risk may be displayed and/or transmitted by server 110.

In some embodiments, risk engine 115 may apply rules to the risk score(s) to determine whether the loan is at risk of prepayment or default. An exemplary rules table 1200 is shown in FIG. 12. Generally speaking, risk engine 115 may categorize loans by accessing rules table 1200, and applying one or more rules to the loans and their corresponding risk scores. Excluding other considerations that will be discussed in more detail below, those loans that have increases in risk scores may typically be categorized as having a prepayment risk, due to the increased ability of the borrower to make extra payments on the loan. Likewise, loans with decreases in risk scores may typically be categorized as having a default risk, due to the decreased ability of the borrower to make their required loan payments.

As shown in FIG. 12, rules table 1200 may include five exemplary rules numbered R1-R5, identified by rule number attribute 1201. Rules table 1200 may also include a risk score attribute 1202, which reflects whether the risk score for a loan increased or decreased relative to the risk score for the previous year. Rules table 1200 may also include a filing status attribute 1203, which reflects whether a loan borrower's filing status changed during a given year, and a tax bracket percentage attribute 1204, which reflects whether a loan borrower's tax bracket percentage changed for a given year. Rules table 1200 may also include a reduced income attribute 1205, which reflects whether a loan borrower reported a decrease in income relative to the previous year. Based on attributes 1202 through 1205, each rule has a corresponding risk category attribute 1206.

For example, referring to Rule R1, if a borrower has no change in risk score, tax bracket, and does not report a reduction in income for a given year, the risk category for the loan is "no change" relative to the previous year. This is true regardless of any change in the borrower's filing status, as indicated by the "any" value of filing status attribute 203 for Rule R1.

As another example, referring to Rule R2, if a borrower's risk score and tax bracket percentage both decrease, they report a reduction in income, and do not report a change in filing status, the risk category for the loan is "default risk," indicating that the loan has an increased risk of defaulting, relative to the previous year. However, as can be seen from Rule R3, just because a borrower's tax bracket percentage and risk score both decrease does not necessarily mean the loan will be categorized as a default risk. Rather, according to Rule R3, reductions in tax bracket percentage and risk score can still result in a loan being categorized as no change, provided the borrower does not report a reduction in income and also changes their filing status from single to married filing jointly. This is because it is possible for borrower's risk scores and tax bracket percentages to decrease simply by changing their filing status, and the decreased risk scores and tax bracket percentage do not necessarily indicate a prepayment risk without a corresponding decrease in income.

As another example, according to Rule R4, if a borrower's risk score and tax bracket percentage both increase, the borrower does not change their filing status relative to the previous year, and they do not report a reduction in income, the loan is categorized as a prepayment risk. This reflects the fact that the borrower's ability to pay their loan has apparently improved, and they do not appear to have changed their filing status or taken other steps that may explain the change in risk score and tax bracket percentage. In contrast, according to Rule R5, a loan may be categorized as no change in prepayment/default risk even if the borrower's risk score increases, as long as they report a change in filing status from "single" to "married filing jointly" and have no change in their tax bracket percentage. This is because the risk scores for the various tax brackets are typically higher for married individuals filing jointly than they are for single filers. Thus, it is likely that a loan to which Rule R5 applies simply has a borrower who got married, and not a borrower who has had a substantial increase in income and is likely to prepay the loan.

In the example discussed above, the risk scores for loan 1 are 7.64 for 2008, and 6.49 for 2009. Thus, the borrower's risk score for 2009 decreased substantially in 2009 to 6.49, relative to the risk score in the previous year of 7.64. Referring to FIG. 5, in 2009, borrower 101 reported a tax filing status of married filing jointly for the first time, whereas in the previous year, borrower 101 filed as a single filer. Moreover, borrower 101's tax bracket percentage fell to the 10% bracket, and borrower 101 has not reported a decrease in income.

Referring back to FIG. 12, Rule R3 applies to borrower 101, because borrower 101 had decreased risk scores and tax bracket percentages, but changed filing status from single to married filing jointly, and did not report a reduction in income. Thus, despite the decreased tax bracket percentages for borrower 101, loan 1 is categorized by risk engine 115 as having no change in the risk of prepayment or default. This may reflect the fact that borrower 101's increased risk score is likely due to the change in filing status, and not necessarily due to increased income.

Note that, had borrower 101 reported no change in filing status and a reduction in income, Rule R3 would not have applied to loan 1. Instead, Rule R2 would have applied, and the loan would have been categorized as a default risk. These circumstances would apply, for instance, had borrower 101 stayed in the single filing status and taken a lower-paying job in 2009 relative to their salary in 2008.

Rules R1-R5 are exemplary, and those skilled in the art will understand that various other rules may be defined to categorize loans by default or prepayment risk. For example, rules may be defined for changes to or from other filing statuses, such as changing from married filing jointly to married filing separately status.

In addition, rules can be used not only to categorize loans by default or prepayment risk, but also to trigger further investigation into the financial status of a borrower. For example, a rule could be defined that when a borrower's risk score and tax bracket percentage decline, but they do not report a change in filing status or a reduction in income, the borrower should be contacted to verify their income for the previous year. This is because, based on tax bracket table 1000, any borrower who has a decrease in their tax bracket percentage and risk score should also have a corresponding decrease in taxable income, unless their filing status has also changed. Thus, if a borrower has both a decreased risk score and tax bracket percentage, but does not report a reduction in income, it is likely that the borrower has either incorrectly reported either their tax bracket percentage or had an unreported reduction in income.

In the embodiments discussed above, risk analysis was performed using a relatively limited set of information, e.g., the borrower's filing status, tax bracket percentage, and whether they had a reduction in income. From the perspective of the borrower, this approach is minimally invasive, because the borrower does not have to report their actual income or other more detailed information to the GSE. However, in embodiments where borrowers provide more detailed updated financial disclosures, such as optional attributes 506-508 shown in FIG. 5, or salary information or other more detailed disclosures, similar techniques as those discussed above may be applied to the more detailed disclosures.

For example, in embodiments where borrowers report their salaries on a yearly basis, rules could be defined that categorize loans as default risks when the borrower's salary declines by some predefined percentage, e.g., 10%, from the previous year. Likewise, if the borrower's salary increases by some predefined percentage, e.g., 15%, the loan could be categorized as a prepayment risk.

Furthermore, when borrowers report information about their liabilities, this information may also be taken into account. For example, if a borrower's monthly debt payments increase above some predetermined percentage of their salary, e.g., 10%, the loan may be categorized as a default risk. Likewise, if a borrower's monthly debt payments decrease by a predetermined percentage of their salary, e.g., 10%, the loan may be categorized as a prepayment risk. In still further embodiments, the risk categorization may take into account the borrower's credit score, the current loan-to-value of the property, and any changes in the monthly payment that may occur in the next year, for example due to an ARM rate being reset. It is to be understood by those skilled in the art that in further embodiments mathematical and statistical modeling techniques such as neural networks, clustering algorithms, Markov-Chains may be used for risk categorization.

Furthermore, in the embodiments discussed above, the borrower's risk scores for a given year, e.g., 2009, were compared to their risk score for the previous year, e.g., 2008, to analyze the risk of prepayments and defaults in the following year, e.g., 2010. In further embodiments, the borrower's risk scores may be averaged over a period of time, for example, five years. Thus, instead of comparing the borrower's risk score for 2009 to their risk score for 2008, their risk score could be compared to the borrower's average risk score for previous years, e.g., 2004-2008, or alternatively a weighted average risk score over that period.

In still further embodiments, borrowers' risk scores are compared to risk scores of other borrowers. For example, all of the borrowers in a given geographical area with loan payments in a given dollar range may be grouped together, and each individual borrower may be evaluated relative to the group. For example, consider loan 1, which has a corresponding zip code of 21222 and a monthly payment 302 of $536. The risk score for borrower 101 could be compared to the average risk score of all of the borrowers in the 21222 zip code with monthly payments between $500 and $600 dollars. If borrower 101's risk score exceeds the group's average by a predetermined amount, e.g., 10%, loan 1 may be categorized as a prepayment risk. Likewise, if the group's average risk score exceeds borrower 101's risk score by 10%, loan 1 may be categorized as a default risk. In still further embodiments, loans can be grouped for purposes of evaluating default/prepayment risk based on other characteristics, such as tax status, occupation, borrower salaries, etc.

Figure 13:
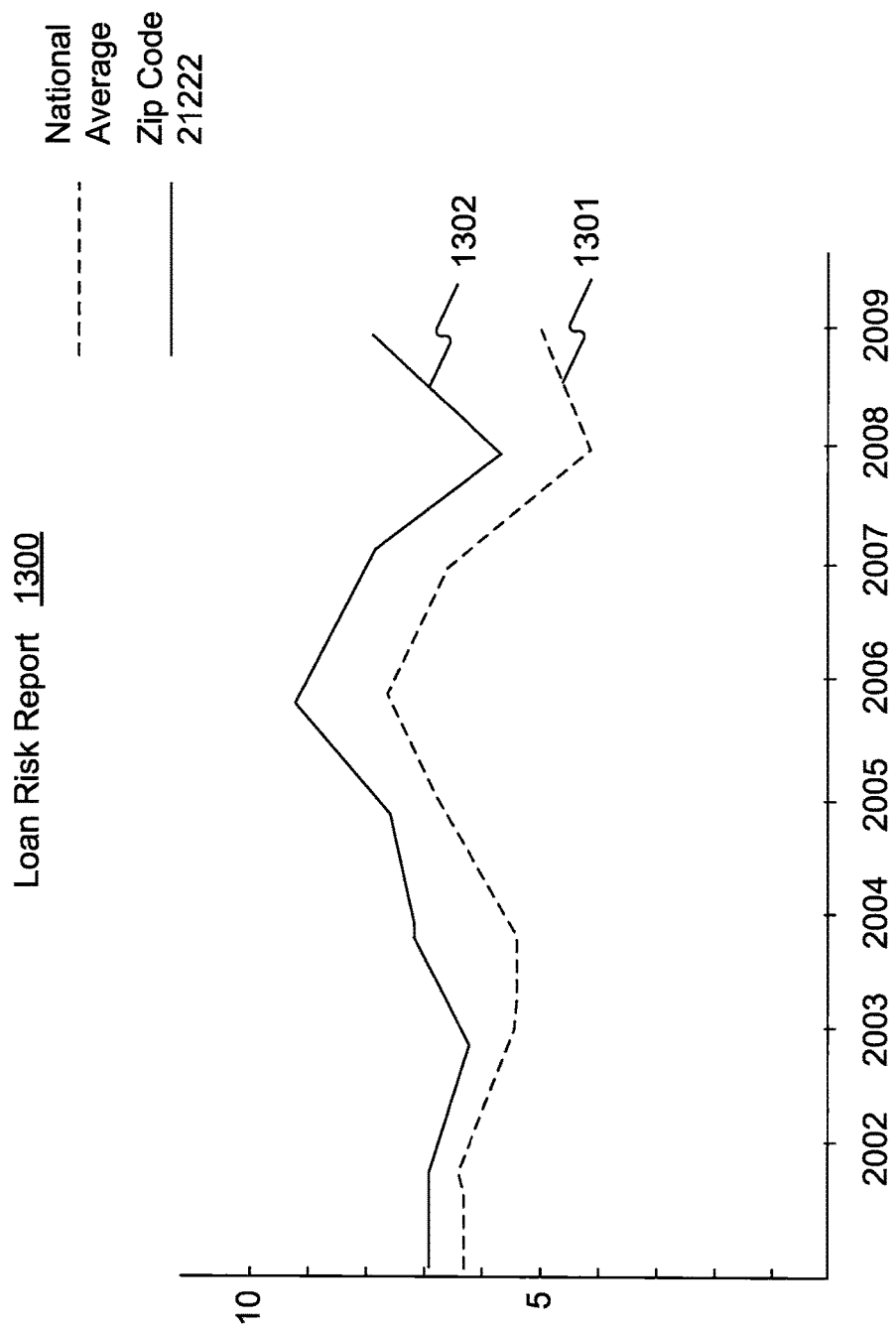
FIG. 13 illustrates an exemplary report, consistent with certain embodiments of the invention.

In still further embodiments, risk engine 115 may provide certain graphical reports of the risk scores for certain groups of loans. As an example, risk engine 115 may provide a loan risk report 1300, such as that shown in FIG. 13. Loan risk report 1300 shows a graph of the national average risk score for all loans, shown as dotted line 1301. Loan risk report 1300 also shows the average risk score for loans in the 21222 zip code, shown as solid line 1302. As can be seen from FIG. 13, the average risk scores for the 21222 zip code are typically somewhat higher than the national average, although they generally follow the trend of the national average over time.

In some circumstances, the risk scores for a given zip code may exhibit different behavior, e.g., starting well above the national average and falling well below the national average. This may suggest that the zip code is experiencing more economic hardship than the nation as a whole. In still further embodiments, rules may be defined for identifying zip codes or other geographical regions that are under economic duress. For example, a rule could be defined that identifies any zip code with an average risk score of 10% or more below the national average as a "troubled" zip code. Risk engine 115 may also generate reports identifying such zip codes and display identifiers of the troubled zip codes to a user, or transmit the reports to other systems or devices (such as systems 130, 140, 150, 160, or 170) connected to network 180.

Reports such as loan risk report 1300 may be generated for various types of loans and for various types of borrowers. For example, reports such as loan risk report 1300 may be generated by risk engine 115 for ARM loans, conforming 30-year loans, for loans with borrowers who file as single status or as married filing jointly, for borrowers in various tax bracket percentages, for different occupations, etc. For example, a report could be generated for all 5/1 ARM loans in zip code 21222, and the report may include lines representing the national average risk scores for 5/1 AR loans as well as the average risk scores in zip code 21222 for 5/1 ARM loans. Other geographical regions, such as counties, states, or metropolitan statistical areas ("MSAs") may be used in place of zip codes.

In still further embodiments, risk engine 115 may generate reports including lists of loans in various zip codes, counties, states, or SA's that are categorized as having either default or prepayment risk. In such embodiments, the loan numbers may be displayed or transmitted for display to users, such as analysts at the GSE. Using such reports, the GSE analysts may be able to take certain steps to mitigate the default or prepayment risk of the loans. For loans at risk of default, the GSE's analysts may coordinate with servicer 150 to take certain steps to prevent a default, such as modifying the loan using method 600. For loans at risk of prepayment, the GSE's analysts may take certain steps such as allocating cash reserves to account for any obligations the GSE may have on MBS's backed by the loans at risk of prepayment.

Figure 14:
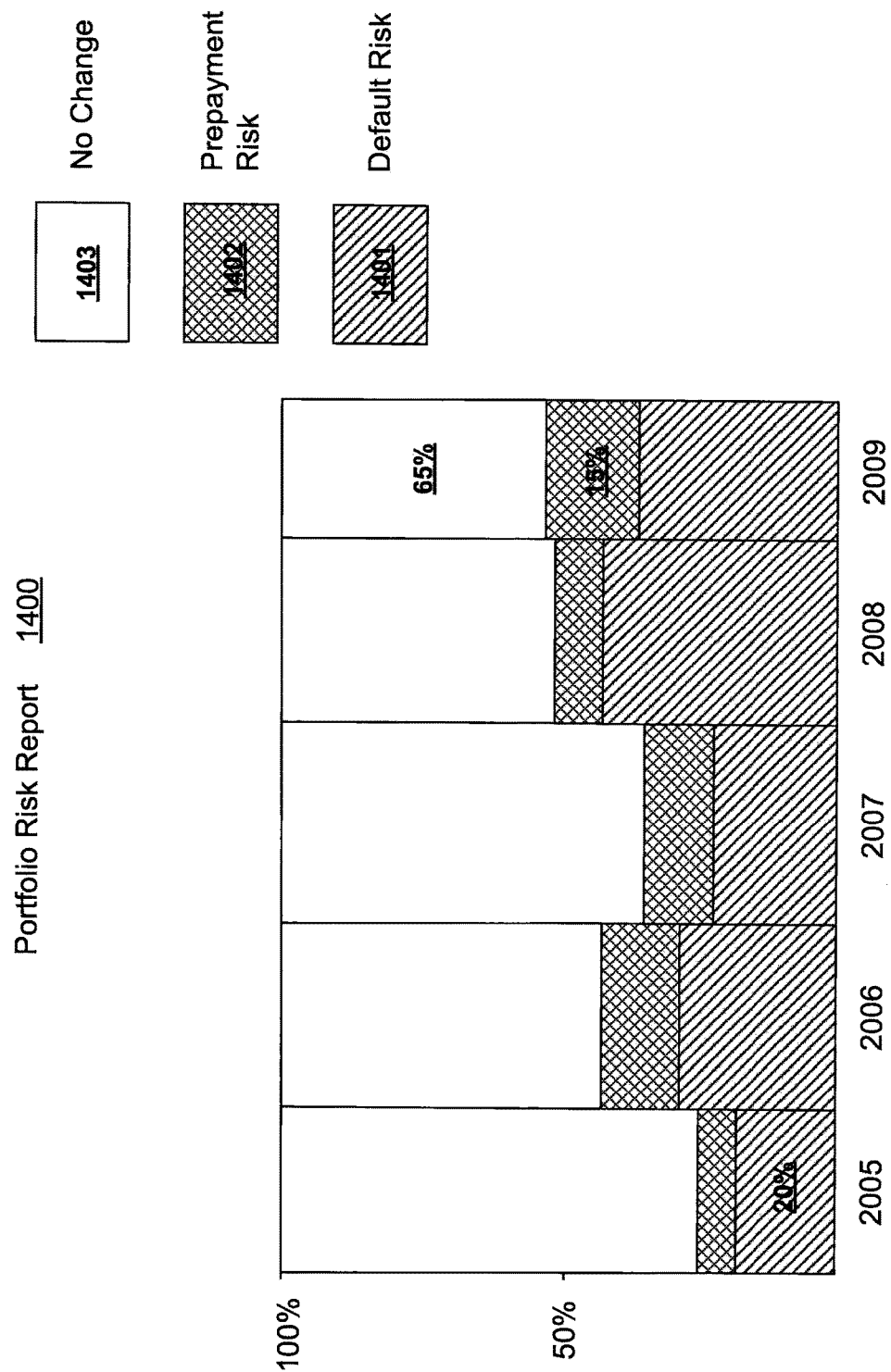
FIG. 14 illustrates an exemplary report, consistent with certain embodiments of the invention.

Risk engine 115 may also generate reports that break down the GSE's portfolio of loans by risk categorization. For example, FIG. 14 illustrates an exemplary portfolio risk report 1400 which shows the percentage of loans that were categorized as prepayment risk, default risk, and no change in default/prepayment risk, for the years 2005 through 2009. As can be seen in FIG. 14, default risk area 1401 indicates that, in 2009, approximately 20% of the GSE's loans were categorized as having a default risk. Likewise, prepayment risk area 1402 indicates that, in 2009, approximately 15% of the GSE's loans were categorized as having a prepayment risk, while unpatterned area 1403 shows that the remaining 65% of the GSE's loans had no change in their risk levels for 2009.

By viewing portfolio risk report 1400, an analyst may be able to derive certain conclusions about the overall state of the GSE's portfolio of loans. For example, the years 2008 and 2009 show a substantially higher percentage of loans with a default risk than the preceding years 2005 through 2007. Moreover, the percentage of the GSE's loans with prepayment risk has increased substantially from 2008 to 2009. Thus, portfolio risk 1400 gives the analyst some insight into the overall health of the GSE's loan portfolio at any given point in time, and also provides insight into how the health of the portfolio is changing over time.

Evaluating MBS Risk

As discussed above, loans may be grouped together to define one or more MBS's, such as MBS 1 and MBS 2. By evaluating the loans underlying a given MBS for risk of prepayment and/or default, it is also possible to evaluate the risk of prepayments and/or defaults for an MBS. For a given MBS, the loan risk scores may be aggregated to provide a combined risk score for the MBS. By providing the aggregate loan risk score for the MBS, investor 170 can evaluate the risk of investing in the MBS directly, based on the aggregate risk score for the MBS. Alternatively, rating agency 160 may rate an MBS, or individual tranches of an MBS, using the aggregate risk score for the underlying loans. Furthermore, in embodiments where the GSE guarantees payment of principal or interest, the GSE can use the aggregate risk score for the MBS to determine how much cash reserves should be set aside for obligations on the MBS that may not be covered by borrower payments, or take out protection on the MBS or individual tranches thereof, for example in the form of credit default swap contracts.

Figure 15:
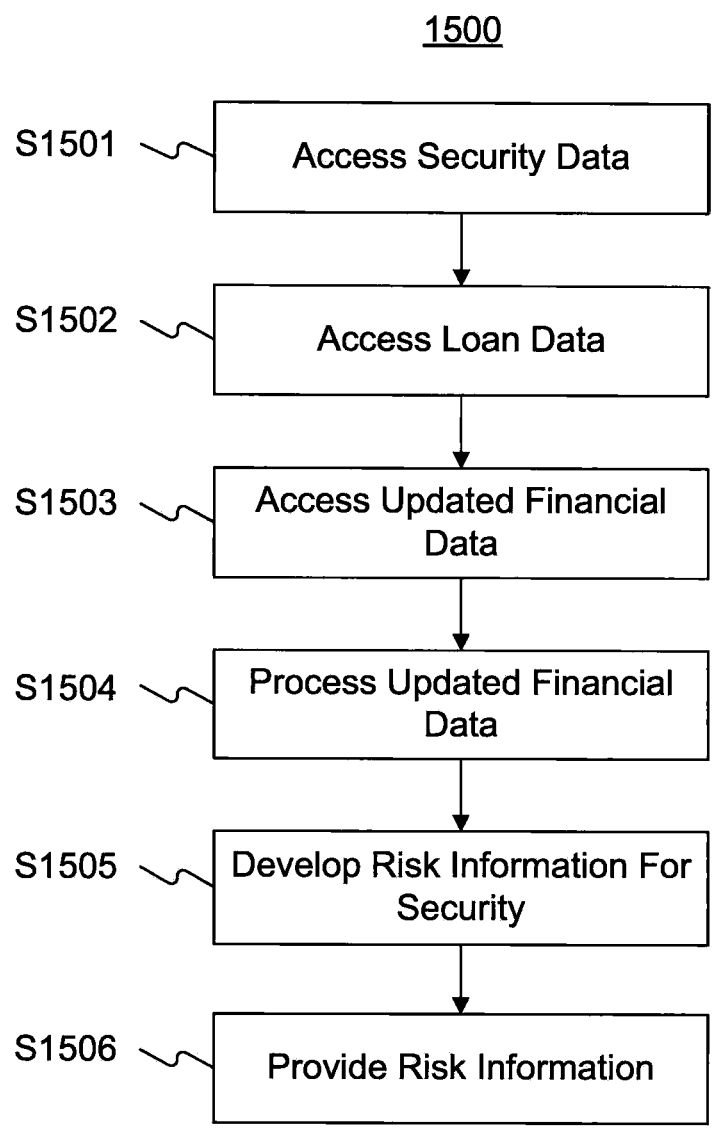
FIG. 15 illustrates a flowchart of an exemplary method, consistent with certain embodiments of the invention.

FIG. 15 illustrates an exemplary method 1500 for evaluating the risk of prepayment events for a security, such as an MBS. Risk engine 115 of server 110 may implement method 1500, as discussed below.

At step S1501, risk engine 115 may access security data for an BS. For example, when evaluating MBS 1, risk engine 115 may access security data 125 for MBS 1, and identify loans 1, 2, and 3 as underlying MBS 1. At this time, risk engine 115 may also access loan weight 804, to determine the weight of each loan relative to total original balance 803.

At step S1502, risk engine 115 may access loan data for the loans identified at step S1501. For example, risk engine 115 may access rows 1-3 of loan data 121, corresponding to loans 1-3. In particular, risk engine 115 may access borrower ID attribute 208, to identify borrowers 101, 102, and 103 as the borrowers of the loans underlying MBS 1.

At step S1503, risk engine 115 may access updated financial data for the borrowers identified at step S1502. For example, risk engine 115 may access updated financial disclosure data 124 for borrowers 101, 102, and 103. When evaluating the risk of MBS 1 for the year 2010, risk engine 115 may access updated financial disclosure data 124 for the previous year, e.g., 2009. In particular, risk engine 115 may access filing status attribute 502 and TBP attribute 503 for each borrower.

At step S1504, risk engine 115 may process the updated financial data identified at step S1503. For example, risk engine 115 may determine individual risk scores for each of loans 1-3. Risk engine 115 may store the risk scores in security data 125 as risk score attribute 1006. Note that borrower 102 did not report filing status 502 or TBP 503 for 2009. In such a case, risk engine 115 may use a previously-reported filing status and TBP for borrower 102, e.g., the 2008 values of "MJ" for married filing jointly filing status, and 15% for TBP 503.

At step S1505, risk engine 115 may develop risk information for the security based on the updated financial data processed at step S1504. For example, risk engine 115 may determine the individual risk scores of each borrower by accessing tax bracket table 1000, and adding these values to security data 125 as risk score attribute 1006. In some embodiments, risk engine 115 may simply average the risk scores for each borrower to determine the risk information for the MBS. In further embodiments, the risk scores for each borrower may be weighted by loan weight attribute 804. FIG. 8 illustrates this latter embodiment, where risk engine 115 determines the weighted risk score 806 of MBS 1 to have a value of 12.44.

At step S1506, risk engine 115 may provide the risk information for MBS 1 developed at step S1505 to a user. For example, risk engine 115 may display the weighted risk score value of 12.44 locally at server 110. Alternatively, risk engine 115 may transmit the weighted risk score value to investor 170 or rating agency 160, for display on these devices or for subsequent processing.

Risk engine 115 may also provide the risk information for MBS 1 in the form of various reports. For example, risk engine 115 may provide an MBS risk report similar to loan risk report 1300 (not shown). Instead of showing the risk scores for zip code 21222, such an MBS risk report may show the risk scores over time for MBS 1, along with the national average risk scores.

In addition, risk engine 115 may categorize the loans underlying BS 1 for risk of default or prepayment, in a manner analogous to that discussed above with respect to method 1100. In such embodiments, risk engine 115 may provide an BS risk report similar to portfolio risk report 1400. Instead of showing a breakdown of risk categories for the GSE's entire loan portfolio, such a risk report may provide a breakdown of risk categories for just the loans underlying MBS 1, by default risk, prepayment risk, and no change.

Using the risk information and reporting features discussed above, it is possible for an analyst at the GSE to assess the default and/or prepayment risks associated with MBS 1. Thus, the GSE is in a better position to evaluate the need to set aside cash reserves or take out contractual protection to insulate them from losses on the MBS obligations. This may be particularly important to the GSE in embodiments where the GSE guarantees payment of principal and interest on the MBS, regardless of whether the borrowers on the loans actually meet their financial obligations.

Furthermore, by providing the risk information for the MBS to rating agency 160, the rating agency may be able to more accurately rate the MBS. For example, MBS 1 may have initially issued with a "AAA" rating, based on the initial financial disclosures of the borrowers, e.g., initial financial disclosure data 123. However, if the risk scores of the borrowers of MBS 1 decline over time, rating agency 160 may determine that the MBS should have a lower rating, e.g., "AA," because of the apparent deterioration of the financial condition of the borrowers. In embodiments where MBS 1 is divided into several tranches, rating agency 170 may rate the individual MBS tranches separately, rather than the MBS as a whole.

Rating agency 170 may provide the BS/tranche ratings by transmitting them to investor 170 or to server 110. In such embodiments, the ratings may be used by investor 170 (whether received from rating agency 170 or from the GSE) to evaluate whether they should invest in the MBS, or in a particular tranche of the MBS. Moreover, if investor 170 is already invested in the MBS, investor 170 may use the ratings to determine whether they should continue to hold their investment in the MBS, or perhaps sell off their share in the MBS because of deteriorating ratings. Moreover, the price of investing in the MBS may be affected by the rating. As between two MBS's or tranches with equivalent returns (interest rates), an investor may prefer to invest in the higher-rated of the two securities.

In still further embodiments, the GSE may provide additional information to rating agency 160 or investor 170 for each MBS or tranche. For example, the GSE may provide national average risk scores or geographical average risk scores for all of the loans owned by the GSE, as well as national and/or geographical average risk scores for the MBS or tranche. In such embodiments, rating agency 160 or investor 170 can compare the risk scores for the MBS or tranche to the corresponding geographical or national averages, to more effectively evaluate the relative merits of investing in the MBS.

Average risk scores may also be provided by borrower age, occupation, property type (e.g., single family home, rental, commercial, vacation property), loan term in years, and/or loan type (e.g., conforming 30 year, ARM, interest only). Furthermore, the risk scores may be broken down by property value or loan amount, e.g., risk scores for all loans under $200,000, risk scores for loans between $200,000 and $300,000, etc. In addition, in embodiments where borrowers provide their credit scores, salary, debt obligations, or other updated financial disclosures such as those discussed above, these values may also be provided to rating agency 160 or investor 170.

In addition, the GSE may provide the risk scores for a given MBS or tranche at the loan level, e.g., provide the individual risk scores for each loan of the MBS. The GSE may also provide the individual risk categorizations for the loans to rating agency 160 or investor 170, for example by identifying the percentage of loans underlying the MBS that are categorized as having no change in risk, prepayment risk, or default risk.

Furthermore, the GSE may provide the risk scores over time to rating agency 160 or investor 170. For example, the GSE may provide weighted average national risk scores for all of the GSE's loans for each year from 2005 through 2009, as well as the weighted average risk scores for 2005 through 2009 for the loans underlying the MBS. Thus, investor 170 and/or rating agency 160 may compare the relative trends of the loans underlying the MBS to the nation as a whole. Even if the risk scores for the MBS are falling, if they are falling at a lower rate than the risk scores for the nation as a whole, the MBS may be a more secure investment than most other MBS's. This is because, relatively speaking, the borrowers for the MBS are holding up financially better than the average borrower in the nation, based on the slower decline in risk scores.

CONCLUSION

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, micro-processors and the like. Additionally, although aspects of the invention are described as being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or existing applications, such as e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and theft full scope of equivalents.

What is claimed is:

1. A computer-implemented method, performed by a risk engine implemented by a processor hosted on a networked server and connected to a networked database through a communication network, the networked server being remote from a lender computer system, a borrower computer system, an investor computer system, and a servicer computer system, the method comprising:
    retrieving, by the risk engine implemented by the processor, first loan data corresponding to a first loan to a first borrower, the first loan being funded based on an initial financial disclosure, the initial financial disclosure reflecting the financial status of the first borrower during an initial time period when the first loan was funded;
    retrieving, by the risk engine implemented by the processor, first payment terms reflecting a first payment obligation of the first borrower on the first loan for use when the first borrower provides an updated financial disclosure, the updated financial disclosure reflecting the financial status of the first borrower after the first loan was funded and during a repayment period for the first loan, wherein a discount is associated with the first payment terms when the updated financial disclosure includes one or more optional disclosures, and wherein the discount is varied from year to year according to a predetermined schedule;
    retrieving, by the risk engine implemented by the processor, second payment terms reflecting a second payment obligation of the first borrower for the first loan for use when the first borrower does not provide the updated financial disclosure;
    determining, by the risk engine implemented by the processor, whether the first borrower provides the updated financial disclosure during the repayment period for the first loan;
    selecting, using the risk engine implemented by the processor, one of the first payment terms or the second payment terms, based on whether the first borrower provides the updated financial disclosure during the repayment period for the first loan; and
    processing, by the risk engine implemented by the processor, the first loan data consistently with the selected payment terms, wherein the processing triggers a recurring update of a determined relative risk of default for the first loan, wherein the determined relative risk of default is calculated based on applying the selected payment terms to one of the initial financial disclosure or the updated financial disclosure, wherein the risk engine determines changes in the determined relative risk of default with each recurring update, the changes in the determined risk relative risk of default being used to determine the first loan's default or prepayment risk, and wherein the recurring update is transmitted in parallel to the borrower computer system, the servicer computer system, and at least one of the lender computer system and the investor computer system.

2. The computer-implemented method according to claim 1, wherein the first loan is a mortgage secured by a first real estate property.

3. The computer-implemented method according to claim 1, wherein:
    the updated financial disclosure comprises mandatory financial attributes based on a contractual agreement by the first borrower to provide the mandatory financial attributes during the repayment term of the first loan, and
    the first payment terms reflect incentives for the first borrower to provide the mandatory financial attributes.

4. The computer-implemented method according to claim 3, wherein the mandatory financial attributes reflect:
    the borrower's tax filing status;
    the borrower's tax bracket percentage;
    whether the borrower had a change in the number of dependents relative to a previous updated financial disclosure or the initial financial disclosure; and whether the borrower had a reduction in income relative to a previous updated financial disclosure or the initial financial disclosure.

5. The computer-implemented method according to claim 3, the updated financial disclosure further comprising optional financial attributes not required by the contractual agreement, the computer-implemented method further comprising:
storing, by the processor, third payment terms reflecting a third payment obligation of the first borrower on the first loan when the borrower provides both the mandatory financial attributes and the optional financial attributes.

6. The computer-implemented method according to claim 5, wherein optional financial attributes are provided by the first borrower on an annual basis, and the third payment terms vary between at least two consecutive years to reflect an increased or decreased incentive to provide the optional financial attributes.

7. The computer-implemented method according to claim 5, wherein the optional financial attributes comprise, for the first borrower:
a credit score, an occupation, income, a tax return, and debt liabilities.

8. The computer-implemented method according to claim 1, wherein the first payment terms reflect a lower interest rate on the first loan than the second payment terms.

9. The computer-implemented method according to claim 1, wherein the second payment terms reflect a penalty fee assessed to the first borrower, and the first payment terms do not reflect the penalty fee.

10. The computer-implemented method according to claim 1, wherein the first borrower provides updated financial disclosures on a periodic, recurring basis during the repayment period of the first loan.

11. The computer-implemented method according to claim 1, wherein:
the first loan is an adjustable-rate mortgage comprising a fixed-rate term with a first interest rate and a rate reset term with a second interest rate;
the updated financial disclosure is received during the rate reset term;
the first payment terms correspond to the second interest rate; and
the second payment terms correspond to a fixed percentage above the second interest rate.

12. The computer-implemented method according to claim 1, wherein the second payment terms reflect the original payment terms of the first loan.

13. A non-transitory computer-readable medium having stored thereon processor-readable instructions which, when executed by a risk engine implemented by a processor hosted on a networked server and connected to a networked database through a communication network, the networked server being remote from a lender computer system, a borrower computer system, an investor computer system, and a servicer computer system, cause the processor to perform a method comprising:
retrieving, by the risk engine, first loan data corresponding to a first loan to a first borrower, the first loan being funded based on an initial financial disclosure, the initial financial disclosure reflecting the financial status of the first borrower during an initial time period when the first loan was funded;
retrieving, by the risk engine, first payment terms reflecting a first payment obligation of the first borrower on the first loan for use when the first borrower provides an updated financial disclosure, the updated financial disclosure reflecting the financial status of the first borrower after the first loan was funded and during a repayment period for the first loan, wherein a discount is associated with the first payment terms when the updated financial disclosure includes one or more optional disclosures, and wherein the discount is varied from year to year according to a predetermined schedule;
retrieving, by the risk engine, second payment terms reflecting a second payment obligation of the first borrower for the first loan for use when the first borrower does not provide the updated financial disclosure;
determining, by the risk engine, whether the first borrower provides the updated financial disclosure during the repayment period for the first loan;
selecting, by the risk engine, one of the first payment terms or the second payment terms, based on whether the first borrower provides the updated financial disclosure during the repayment period for the first loan; and
processing, by the risk engine, the first loan data consistently with the selected payment terms, wherein the processing triggers a recurring update of a determined relative risk of default for the first loan, wherein the determined relative risk of default is calculated based on applying the selected payment terms to one of the initial financial disclosure or the updated financial disclosure, wherein the risk engine determines changes in the determined relative risk of default with each recurring update, the changes in the determined risk relative risk of default being used to determine the first loan's default or prepayment risk, and wherein the recurring update is transmitted in parallel to the borrower computer system, the servicer computer system, and at least one of the lender computer system and the investor computer system.

14. The computer-readable medium according to claim 13, wherein the first loan is a mortgage secured by a first real estate property.

15. The computer-readable medium according to claim 13, wherein:
the updated financial disclosure comprises mandatory financial attributes based on a contractual agreement by the first borrower to provide the mandatory financial attributes during the repayment term of the first loan, and
the first payment terms reflect incentives for the first borrower to provide the mandatory financial attributes.

16. The computer-readable medium according to claim 15, wherein the mandatory financial attributes reflect:
the borrower's tax filing status;
the borrower's tax bracket percentage;
whether the borrower had a change in the number of dependents relative to a previous updated financial disclosure or the initial financial disclosure; and
whether the borrower had a reduction in income relative to a previous updated financial disclosure or the initial financial disclosure.

17. The computer-readable medium according to claim 13, wherein the first payment terms reflect a lower interest rate on the first loan than the second payment terms.

18. The computer-readable medium according to claim 13, wherein the first borrower provides updated financial disclosures on a periodic, recurring basis during the repayment period of the first loan.

19. The computer-readable medium according to claim 13, wherein:
   the first loan is an adjustable-rate mortgage comprising a fixed-rate term with a first interest rate and a rate reset term with a second interest rate;
   the updated financial disclosure is received during the rate reset term;
   the first payment terms correspond to the second interest rate; and
   the second payment terms correspond to a fixed percentage above the second interest rate.

20. The computer-readable medium according to claim 13, wherein the second payment terms reflect the original payment terms of the first loan.

* * * * *